US011113884B2

(12) United States Patent
Demirchian et al.

(10) Patent No.: US 11,113,884 B2
(45) Date of Patent: Sep. 7, 2021

(54) TECHNIQUES FOR IMMERSIVE VIRTUAL REALITY EXPERIENCES

(71) Applicant: DISNEY ENTERPRISES, INC., Burbank, CA (US)

(72) Inventors: Hambartsoum Demirchian, Encino, CA (US); Madhura Pitale, Torrance, CA (US); Isaaca Seychelle Graetz Hoglen, Glendale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/049,745

(22) Filed: Jul. 30, 2018

(65) Prior Publication Data
US 2020/0035026 A1 Jan. 30, 2020

(51) Int. Cl.
*G06T 19/00* (2011.01)
*H04N 21/235* (2011.01)
(Continued)

(52) U.S. Cl.
CPC ............ *G06T 19/006* (2013.01); *G06T 19/20* (2013.01); *H04N 21/2353* (2013.01);
(Continued)

(58) Field of Classification Search
CPC .................. G06T 19/006; G06T 19/20; G06T 2219/2012; G06T 2219/2004; H04N 21/2353; H04N 21/2393; H04N 21/4126; H04N 21/8146; H04N 21/8586; H04N 21/812; H04N 21/41422; H04N 21/4755; H04N 21/816; H04N 21/44218; H04N 21/435; H04N 21/21; H04N 21/4312; H04N 21/6547; H04N 21/235; G09G 5/006; G09G 2354/00; G09G 2360/144; G06F 3/011; G06F 3/147
See application file for complete search history.

(56) References Cited

U.S. PATENT DOCUMENTS 6,463,585 B1  10/2002  Hendricks et al.
7,146,627 B1  12/2006  Ismail et al.
(Continued)

OTHER PUBLICATIONS

Yu Wu et al., "Automatic Chatbot Knowledge Acquisition from Online Forum via Rough Set and Ensemble Learning", IFIP International Conference on Network and Parallel Computing, 2008, 5 pages.

(Continued)

*Primary Examiner* — Jennifer Mehmood
*Assistant Examiner* — Andrew Shin
(74) *Attorney, Agent, or Firm* — Artegis Law Group, LLP

(57) ABSTRACT

Various embodiments of the invention disclosed herein provide techniques for generating a three-dimensional virtual environment. A 3D object/effects generator executing on a client device receives a media content item. The 3D object/effects generator receives content metadata associated with the media content item. The 3D object/effects generator generates at least a portion of a 3D virtual environment based on the content metadata. The 3D object/effects generator displays the media content item and the at least a portion of the 3D virtual environment on a display associated with a virtual reality device.

20 Claims, 13 Drawing Sheets

(51) Int. Cl.
    *H04N 21/239*     (2011.01)
    *H04N 21/41*     (2011.01)
    *H04N 21/858*     (2011.01)
    *G06T 19/20*     (2011.01)
    *H04N 21/81*     (2011.01)

(52) U.S. Cl.
    CPC ..... *H04N 21/2393* (2013.01); *H04N 21/4126* (2013.01); *H04N 21/8146* (2013.01); *H04N 21/8586* (2013.01); *G06T 2219/2012* (2013.01)

(56) References Cited

U.S. PATENT DOCUMENTS

| | | | |
|---|---|---|---|
| 8,171,509 | B1 | 5/2012 | Girouard et al. |
| 9,038,107 | B2 | 5/2015 | Khoo et al. |
| 9,602,884 | B1 | 3/2017 | Eldering et al. |
| 9,785,684 | B2 | 10/2017 | Allen et al. |
| 10,078,917 | B1 | 9/2018 | Gaeta et al. |
| 2007/0094041 | A1* | 4/2007 | Coale .................. G06F 3/04815 345/419 |
| 2010/0306655 | A1* | 12/2010 | Mattingly ............. G06F 3/0482 715/720 |
| 2012/0127284 | A1* | 5/2012 | Bar-Zeev ............. G02B 27/017 348/53 |
| 2014/0007157 | A1 | 1/2014 | Harrison et al. |
| 2014/0143806 | A1 | 5/2014 | Steinberg et al. |
| 2014/0279050 | A1 | 9/2014 | Makar et al. |
| 2015/0032766 | A1* | 1/2015 | Greenbaum .......... G06F 16/444 707/756 |
| 2015/0095277 | A1 | 4/2015 | Tristan et al. |
| 2015/0113570 | A1 | 4/2015 | Klarfeld et al. |
| 2015/0302639 | A1* | 10/2015 | Malekian ............ G06F 17/2288 345/420 |
| 2015/0328550 | A1 | 11/2015 | Herzig et al. |
| 2016/0378861 | A1 | 12/2016 | Eledath et al. |
| 2017/0076498 | A1* | 3/2017 | Dakss ................... G09G 5/006 |
| 2017/0344532 | A1 | 11/2017 | Zhou et al. |
| 2018/0052885 | A1 | 2/2018 | Gaskill et al. |
| 2018/0150749 | A1 | 5/2018 | Wu et al. |
| 2018/0165596 | A1 | 6/2018 | Abrams et al. |
| 2019/0174172 | A1 | 6/2019 | Eubanks |
| 2019/0230387 | A1 | 7/2019 | Gersten |

OTHER PUBLICATIONS

Antonella Santangelo et al., "A Virtual Shopper Customer Assistant in Pervasive Environments", 2007, 10 pages.
Non-Final Office Action received for U.S. Appl. No. 16/853,451 dated Mar. 4, 2021, 11 pages.
Non-Final Office Action received for U.S. Appl. No. 15/373,352 dated Jun. 20, 2019, 29 pages.
Final Office Action received for U.S. Appl. No. 15/373,352 dated Oct. 11, 2019, 32 pages.
Non-Final Office Action received for U.S. Appl. No. 15/373,352 dated Jan. 30, 2020, 30 pages.
Final Office Action received for U.S. Appl. No. 15/373,352 dated May 13, 2020, 31 pages.
Non-Final Office Action received for U.S. Appl. No. 15/373,352 dated Dec. 15, 2020, 28 pages.
Final Office Action received for U.S. Appl. No. 15/373,352, dated May 3, 2021, 72 pages.

* cited by examiner

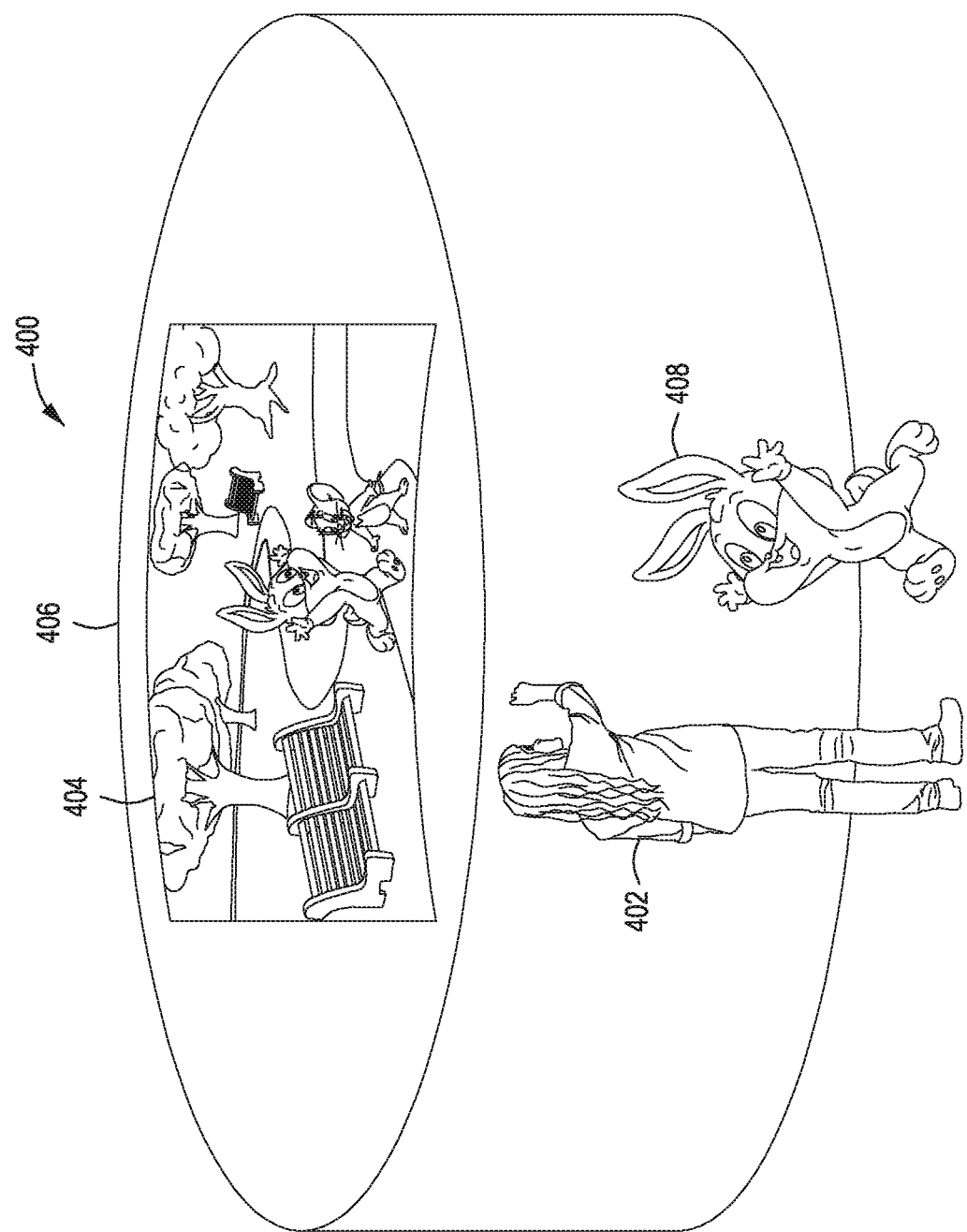

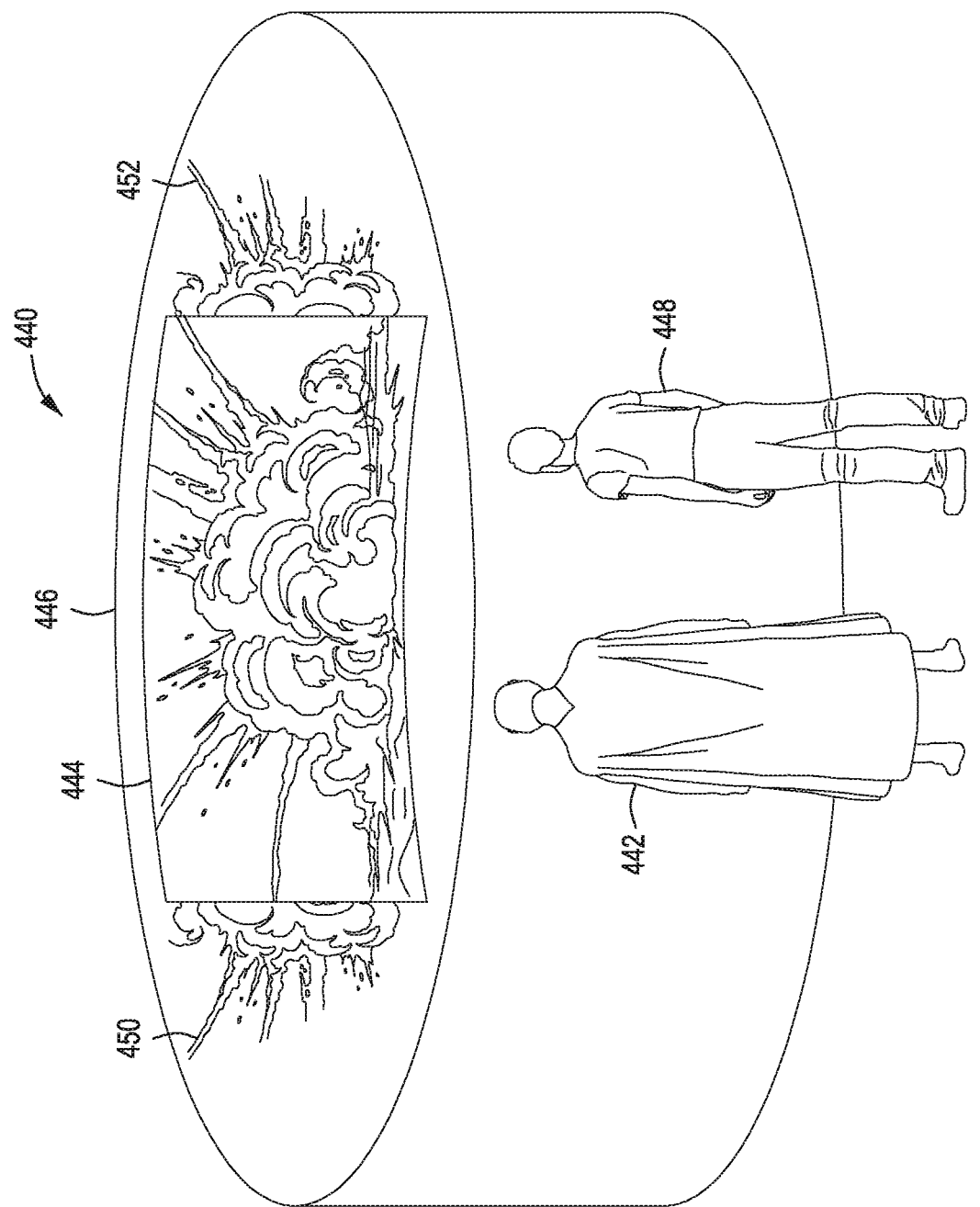

TECHNIQUES FOR IMMERSIVE VIRTUAL REALITY EXPERIENCES

BACKGROUND OF THE INVENTION

Field of the Invention

The present invention relates generally to virtual reality systems and, more specifically, to techniques for immersive virtual reality experiences.

Description of the Related Art

Virtual reality (VR) is a rapidly growing form of media entertainment. In a VR system, a user experiences an artificial three-dimensional (3D) environment generated by a computer. The user views the VR environment via a display apparatus, such as VR glasses or a VR headset. The display apparatus may be fitted with speakers or other auditory devices to generate sounds. Further, the display apparatus may be fitted with haptic feedback devices to generate tactile and kinesthetic stimulus. The virtual reality system also may include various sensors, such as cameras, microphones, accelerometers, and gyroscopes, in order to receive oral, physical, and visual inputs from the user. In this manner, the user is able to navigate through a simulated 3D environment complete with sight, sound, and touch.

In some applications, a user can view two-dimensional (2D) media content, such as movies, television programs, or other video sources, while experiencing the virtual 3D environment. In such cases, the VR system typically generates a fixed 3D environment, such as a living room, and projects the 2D media content onto a virtual display screen that is present in the fixed 3D environment. The user then views the 2D media content on the virtual display screen within the virtual 3D environment. One drawback to this approach is that the interaction between the user and the VR environment is typically quite minimal. Consequently, the user experience is oftentimes static, passive, and essentially the same as watching a movie or television program in one's own living room. As a result, the user does not enjoy the rich, immersive 3D experience that VR systems are capable of generating and providing.

As the foregoing illustrates, what is needed in the art are more effective techniques for generating immersive environments when viewing 2D media content via a VR system.

SUMMARY OF THE INVENTION

Various embodiments of the present application set forth a computer-implemented method for generating a three-dimensional virtual environment. The method includes receiving a media content item. The method further includes receiving content metadata associated with the media content item. The method further includes generating at least a portion of a 3D virtual environment based on the content metadata. The method further includes displaying the media content item and the at least a portion of the 3D virtual environment on a display associated with a virtual reality device.

Other embodiments of the present invention include, without limitation, a computer-readable medium including instructions for performing one or more aspects of the disclosed techniques, as well as a computing device for performing one or more aspects of the disclosed techniques.

At least one advantage of the disclosed techniques is that 2D media content, when viewed via a VR headset, is more interactive and customizable relative to prior approaches. More particularly, by presenting appropriate 3D elements in the VR environment and providing customized selections of different aspects of the VR environment, the user experience is more immersive and unique relative to prior approaches. As a result, the user has the experience of being "inside" the 2D media content rather than just viewing the content from an "outsider's" perspective. These advantages represent one or more technological improvements over the prior art.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 4A-4D illustrate various examples of an immersive VR environment generated by the system of FIG. 1, according to various embodiments of the present invention;

DETAILED DESCRIPTION

In the following description, numerous specific details are set forth to provide a more thorough understanding of the present invention. However, it will be apparent to one of skill in the art that embodiments of the present invention may be practiced without one or more of these specific details.

System Overview

Figure 1:
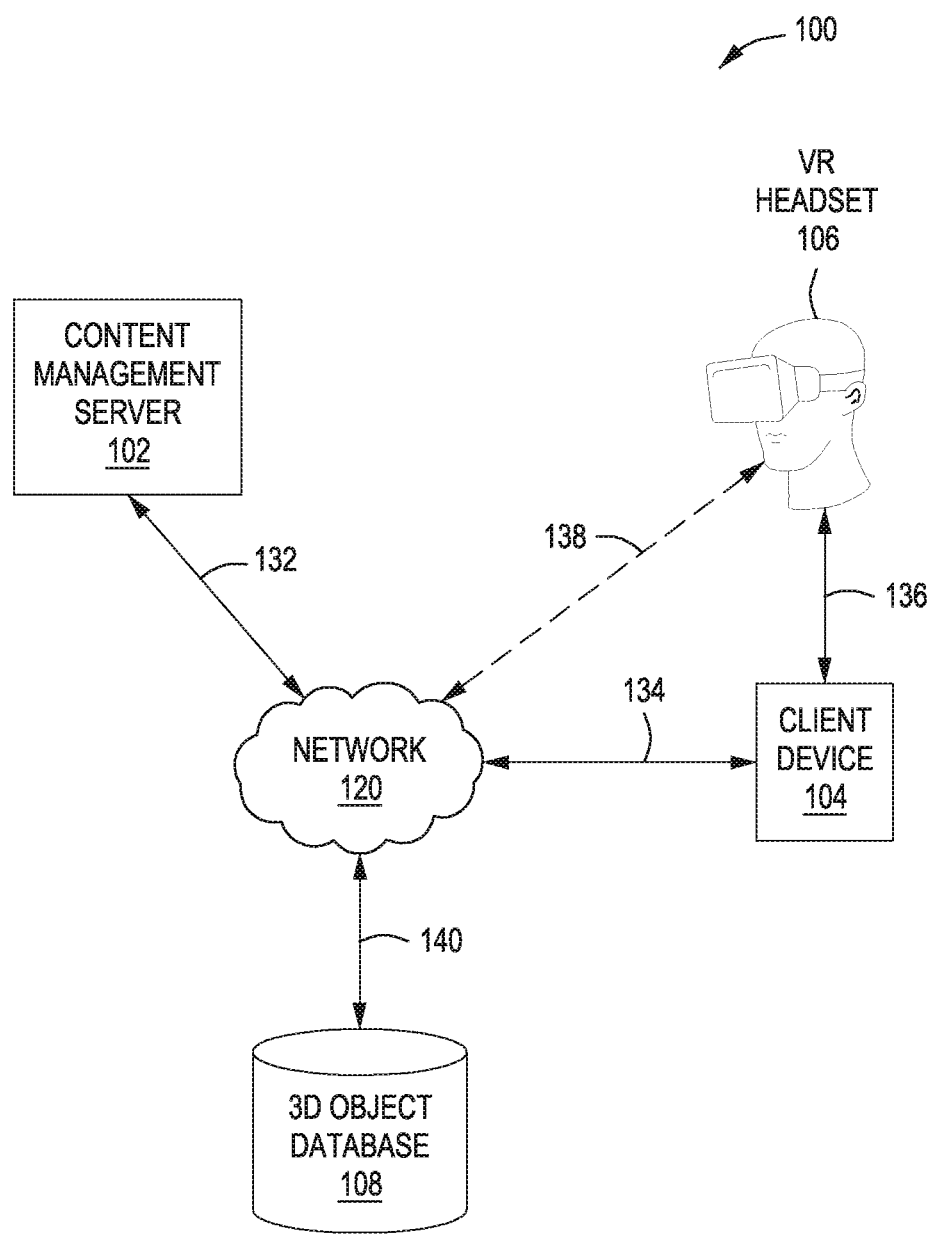
FIG. 1 illustrates a system configured to implement one or more aspects of the present invention.

FIG. 1 illustrates a system 100 configured to implement one or more aspects of the present invention. As shown, the system includes, without limitation, a content management server 102, a client device 104, a VR headset 106, and a 3D object database 108 in communication with each other via a network 120. Network 120 may be any suitable environment to enable communications among remote or local computer systems and computing devices, including, without limitation, wireless and wired LANs (Local Area Networks) and internet-based WANs (Wide Area Networks).

The content management server 102, also referred to herein as a content management system (CMS), includes, without limitation, a computing device that may be a stand-alone server, a cluster or "farm" of servers, one or more network appliances, or any other device suitable for implementing one or more aspects of the present invention.

Illustratively, content management server 102 communicates over network 120 via communications link 132.

As further described herein, content management server 102 receives virtual environment data associated with a particular item of 2D media content, such as a movie, television program, or other video content. In some embodiments, content management server 102 may receive the virtual environment data from a user, such as a production assistant or post-production assistant. The user may enter the virtual environment data via a graphical user interface (GUI), an electronic form, or via any other technically feasible approach. The virtual environment data includes information that refers to the 2D media content as a whole, such as a description of the virtual environment and the movie buddy associated with the movie. The virtual environment data also includes information regarding effects that occur at particular points in time during the movie, including, without limitation, color effects, 3D object effects, environment vibration effects, and screen size, location, and vibration effects.

Upon receiving the virtual environment data, content management server 102 generates corresponding 3D content metadata. Content management server 102 may generate and store the 3D content metadata concurrently with or shortly after receiving the virtual environment data. Then, when client device 104 requests a movie, television program, or other video content, content management server 102 may retrieve and transmit the 3D content metadata to client device 104. Alternatively, content management server 102 may store the virtual environment data in memory or storage. Then, client device 104 requests a movie, television program, or other video content, content management server 102 may retrieve the corresponding virtual environment data, generate the 3D content metadata, and transmit the 3D content metadata to the client device 104. The 3D content metadata may be in any technically feasible format, including, without limitation, JavaScript Object Notation (JSON), eXtensible Markup Language (XML), and HyperText Markup Language (HTML).

Client device 104 includes, without limitation, a computing device that may be a personal computer, video game console, personal digital assistant, mobile phone, mobile device, or any other device suitable for implementing one or more aspects of the present invention. Illustratively, client device 104 communicates over network 120 via communications link 134. Communications link 134 may be any technically feasible communication channel, including, without limitation, point-to-point communications channels, one or more LANs, and one or more internet-based WANs. Further, client device 104 communicates with VR headset 106 over any technically feasible wired or wireless communications protocol via communications link 136.

As further described herein, client device 104 receives user requests to view 2D media content items, such as movies, television programs, or other video content. Upon receiving a user request to view a 2D media content item, client device 104 transmits the request to content media server 102. In response, content management server 102 transmits the 2D media content to client device 104. In addition, content management server 102 transmits the corresponding 3D content metadata to client device 104. Based on the 3D content metadata, client device retrieves descriptions of any needed 3D content items from 3D object database 108. From the 3D content metadata and 3D objects, client device 104 generates a 3D environment and any other related 3D objects to create a 3D virtual environment. Client device 104 further generates a virtual screen within the 3D virtual environment and displays the 2D media content on the virtual screen. Client device 104 further generates a virtual movie buddy who watches the 2D media content with the user. Client device 104 translates the generated 2D and 3D visual elements into the native format of VR headset 106. Client device 104 transmits the translated 2D and 3D visual elements for display.

VR headset 106 includes, without limitation, a computing device that may be a personal computer, video game console, personal digital assistant, mobile phone, mobile device, or any other device suitable for implementing one or more aspects of the present invention. Illustratively, VR headset 106 communicates with client device 104 over any technically feasible wired or wireless communications protocol via communications link 136. VR headset 106 receives translated 2D and 3D visual elements from client device 104. VR headset 106 displays the received 2D and 3D visual elements on a display screen associated with VR headset 106.

In addition or alternatively, VR headset 106 communicates over network 120 via communications link 138. Communications link 138 may be any technically feasible communication channel, including, without limitation, point-to-point communications channels, one or more LANs, and one or more internet-based WANs. Via communications link 138, VR headset 106 performs any one or more functions described in conjunction with client device 104, as further described herein.

3D object database 108 includes, without limitation, a storage device that may be a standalone networked attach storage (NAS) system, a storage area-network (SAN), a cluster or "farm" of storage devices, a distributed storage architecture, or any other device suitable for implementing one or more aspects of the present invention. In addition or alternatively, 3D object database 108 may include, without limitation, a computing device with a storage subsystem that may be a standalone server, a cluster or "farm" of servers, one or more network appliances, or any other device suitable for implementing one or more aspects of the present invention. Illustratively, 3D object database 108 communicates over network 120 via communications link 140. 3D object database 108 stores 3D virtual environment data, 3D object data, movie buddy data, and any other information to perform one or more of the techniques disclosed herein.

It will be appreciated that the system shown herein is illustrative and that variations and modifications are possible. In one example, although the system 100 of FIG. 1 is illustrated with one content management server 102, one client device 104, one VR headset 106, and one 3D object database 108, the system 100 could include any technically feasible number of content management servers 102, client devices 104, VR headsets 106, and 3D object database 108 within the scope of the present disclosure. In another example, the 2D content items, virtual environment data and 3D content metadata are described as being stored on content management server 102. Similarly, 3D virtual environment data, 3D object data, movie buddy data are described as being stored on 3D object database 108. However, any data could be stored on any technically feasible computing device or storage device that is in communication with network 120.

In another example, the techniques described herein could be used in conjunction with live events, such as sporting events. In such cases, a production assistant or an automated statistics data system could provide data and markers on the occurrence of specific key events occurring during the live event. Content management server 102 generates 3D content metadata corresponding to the data and markers, and transmits the 3D content metadata to client device 104. In this manner, content management server 102 could generate and transmit the 3D content metadata as a live data feed in conjunction with the live video feed. The 3D content metadata could identify key events, such as a first down, touchdown, or field goal in American football, to trigger environmental, screen, and buddy effects. The movie buddy could be the user's favorite football player. Alternatively, the movie buddy could be a default buddy selected from one of the competing teams or from the set of announcers for the game. The environment could be a simulated arena or stadium filled with cheering fans.

In addition, one of the user selections could be the team that the user is rooting for. When the selected team scores, content management server 102 transmits corresponding 3D content metadata to client device 104. Client device generates appropriate effects in the 3D virtual environment. Such effects could include, without limitation, the crowd in the environment that rises and cheers, fireworks appears overhead, your movie buddy jumps up and down with the user, and the screen vibrates and expands. These effects could be programmed prior to the live event. The effects are then triggered when the client device receives the live 3D content metadata.

In yet another example, the 3D virtual environment, movie buddy, and various effects could be supplied by a third party in addition to or alternatively to such content being supplied by the original producer of the 2D media content. In this manner, the director or an actor in a movie could appear as the movie buddy and provide commentary as the movie is being displayed on the virtual screen. A third party movie buddy could appear and provide humorous or informative information and additional monologue or dialogue as the movie is being displayed. Such third party content provides additional options for the 3D virtual environment that could be available for selection by the user when viewing 2D content. The user could select a movie and separately select 3D content metadata and 3D objects that are independently created by third parties.

Several techniques for generating and displaying 3D virtual objects in conjunction with 2D media content are now described in further detail.

VR System for Generating Immersive Virtual Reality Experiences

Figure 2:
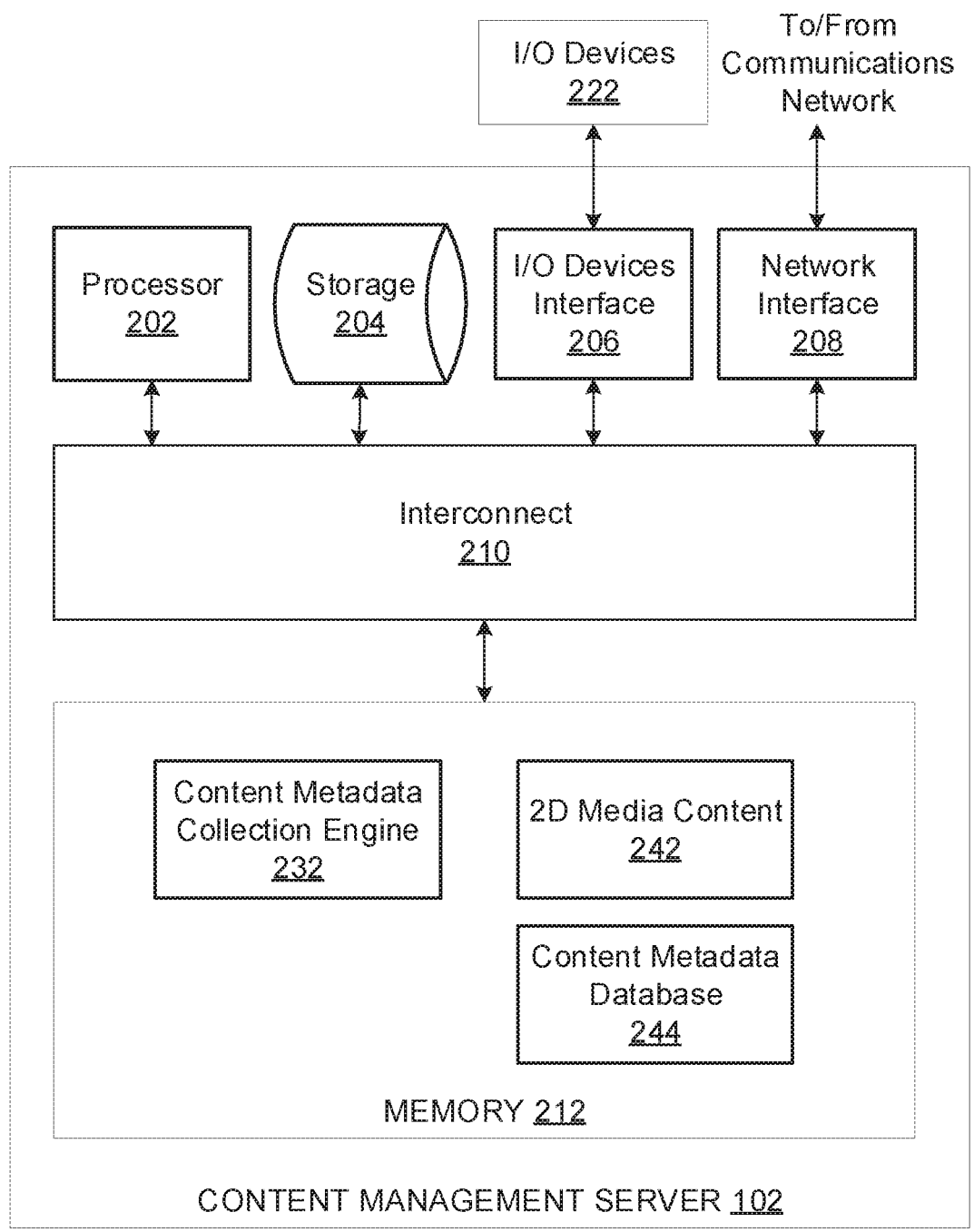
FIG. 2 is a more detailed illustration of the content management server of FIG. 1, according to various embodiments of the present invention.

FIG. 2 is a more detailed illustration of the content management server 102 of FIG. 1, according to various embodiments of the present invention. As shown, content management server 102 includes, without limitation, a central processing unit (CPU) 202, storage 204, an input/output (I/O) devices interface 206, a network interface 208, an interconnect 210, and a system memory 212.

The processor 202 retrieves and executes programming instructions stored in the system memory 212. Similarly, the processor 202 stores and retrieves application data residing in the system memory 212. The interconnect 210 facilitates transmission, such as of programming instructions and application data, between the processor 202, input/output (I/O) devices interface 206, storage 204, network interface 208, and system memory 212. The I/O devices interface 206 is configured to receive input data from user I/O devices 222. Examples of user I/O devices 222 may include one or more buttons, a keyboard, and a mouse or other pointing device. The I/O devices interface 206 may also include an audio output unit configured to generate an electrical audio output signal, and user I/O devices 222 may further include a speaker configured to generate an acoustic output in response to the electrical audio output signal. Another example of a user I/O device 222 is a display device that generally represents any technically feasible means for generating an image for display. For example, the display device could be a liquid crystal display (LCD) display, CRT display, or DLP display. The display device may be a TV that includes a broadcast or cable tuner for receiving digital or analog television signals.

Processor 202 is included to be representative of a single CPU, multiple CPUs, a single CPU having multiple processing cores, and the like. And the system memory 212 is generally included to be representative of a random access memory. The storage 204 may be a disk drive storage device. Although shown as a single unit, the storage 204 may be a combination of fixed and/or removable storage devices, such as fixed disc drives, floppy disc drives, tape drives, removable memory cards, or optical storage, network attached storage (NAS), or a storage area-network (SAN). Processor 202 communicates to other computing devices and systems via network interface 208, where network interface 208 is configured to transmit and receive data via a communications network.

The system memory 212 includes, without limitation, a content metadata collection engine 232, 2D media content 242, and a content metadata database 244. The content metadata collection engine 232, when executed by the processor 202, performs one or more operations associated with the content management server 102 of FIG. 1, as further described herein. In operation, content metadata collection engine 232 receives virtual environment data and generates corresponding 3D content metadata.

The virtual environment data identifies the corresponding 2D media content. The virtual environment data further includes various details regarding the 3D virtual environment, virtual screen, and movie buddy. For example, the virtual environment data could specify sound data, such as words spoken by the movie buddy and sound effects. Further, virtual environment data could specify certain times when the volume is adjusted up or down. The virtual environment data could specify color and location of the environment. For example, a blinking red light in the 2D media content may trigger a blinking red light in the environment as well as other chromatic effects. The virtual environment data could specify vibration effects for the environment and the virtual screen. For example, an explosion in the 2D media content movie could trigger vibration of the virtual environment and the virtual screen.

The virtual environment data could specify the screen size and location of the virtual screen. For example, during an intense scene in the 2D media content, the virtual screen could move closer and then move back when the scene is complete. The virtual environment data could specify 3D objects to display during playback of the 2D media content, such as the 3D virtual environment and the movie buddy. The virtual environment data could further specify certain 3D objects to generate and display at specific times during playback of the 2D media content, such as flying debris during an explosion or flying bugs during an appropriate scene.

The virtual environment data could also specify 3D objects to generate and display locally as well as 3D object models to download from 3D object database 108. The locally generated and animated 3D objects may be simple objects, such as flying cubes, pyramids, raindrops, and bubbles, as well as complex objects, such as movie buddies and animals travelling through the 3D virtual environment.

Content metadata collection engine 232 generates and stores the 3D content metadata concurrently with or shortly after receiving the virtual environment data. Then, when client device 104 requests a movie, television program, or other video content, metadata collection engine 232 retrieves and transmits the 3D content metadata to client device 104. Alternatively, content metadata collection engine 232 stores the virtual environment data in memory or storage. Then, when client device 104 requests a movie, television program, or other video content, content metadata collection engine 232 retrieves the corresponding virtual environment data, generates the 3D content metadata, and transmits the 3D content metadata to client device 104.

The generated 3D content metadata includes attributes for various aspects of the 3D virtual environment and movie buddy associated with the 2D media content. In one example, the 3D content metadata could include a first section of 3D content describing elements that correspond to the 2D media content as a whole rather than to a specific time. Further, the 3D content metadata could include a second section of optical content that describes particular effects that occur at a particular time during the display of the 2D media content. The 3D content section includes a description of an ocean room-themed environment and a movie buddy. The optical content section includes various color, location, size, vibration and animated object effects that occur at key points as the 2D media content plays on the virtual screen. A listing of the 3D content metadata defining these elements is illustrated in Table 1 below. Although the 3D content metadata of Table 1 is presented in JavaScript Object Notation (JSON), any technically feasible format may be used within the scope of the present disclosure.

TABLE 1

3D Content Metadata Example

```
0010  {
0020    "3d_content": {
0030      "environment": {
0040        "name": "oceanRoom",
0050        "type": "roomSetting",
0060        "value": "http://cdn1.edgedatg.com/aws/3d123123.3dx",
0070        "quality": "high",
0080        "format": "3dx",
0090        "id": "99"
0100      },
0110      "movie_buddy": {
0120        "name": "mybuddy",
0130        "type": "defaultBuddy",
0140        "animated": true,
0150        "sound": true,
0160        "value": "http://cdn1.edgedatg.com/aws/3dbwww123.3dx",
0170        "quality": "high",
0180        "format": "3dx",
0190        "id": "100"
0200      }
0210    },
0220    "optical_content": {
0230      "color": {
0240        "type": "redFlashingLights",
0250        "r_value": 255,
0260        "g_value": 0,
0270        "b_value": 0,
0280        "duration": 3000,
0290        "startTime": 234343,
0300        "fadeout": true,
0310        "fadeoutStart": 2500,
0320        "fadein": true,
0330        "fadeinStop": 500,
0340        "id": "101"
0350      },
0360      "environment_vibration": {
0370        "type": "upAndDown",
```

TABLE 1-continued

3D Content Metadata Example

```
0380        "duration": 2300,
0390        "startTime": 678343,
0400        "id": "103"
0410      },
0420      "3d_effects": {
0430        "3d_effect": [
0440          {
0450            "name": "flyingCube",
0460            "type": "explosionEffect",
0470            "generateNew": false,
0480            "value": "http://cdn1.edgedatg.com/aws/cube1.3dx",
0490            "quality": "low",
0500            "format": "3dx",
0510            "type": "upAndDown",
0520            "duration": 2300,
0530            "startTime": 678343,
0540            "start_position": "14, 343, 12",
0550            "end_position": "250, 343, 12"
0560          },
0570          {
0580            "name": "flyingCube",
0590            "type": "explosionEffect",
0600            "generateNew": false,
0610            "value": "http://cdn1.edgedatg.com/aws/cube2.3dx",
0620            "quality": "low",
0630            "format": "3dx",
0640            "type": "upAndDown",
0650            "duration": 2300,
0660            "startTime": 678343,
0670            "start_position": "12, 43, 12",
0680            "end_position": "150, 343, 12"
0690          },
0700          {
0710            "name": "flyingCube",
0720            "type": "explosionEffect",
0730            "generateNew": false,
0740            "value": "http://cdn1.edgedatg.com/aws/cube3.3dx",
0750            "quality": "low",
0760            "format": "3dx",
0770            "type": "upAndDown",
0780            "duration": 2300,
0790            "startTime": 678343,
0800            "start_position": "22, 343, 12",
0810            "end_position": "250, 343, 12"
0820          },
0830        ],
0840        "count": 3,
0850        "id": "2052377"
0860      },
0870      "screen_vibration": {
0880        "type": "sideToSide",
0890        "duration": 2300,
0900        "startTime": 678343,
0910        "id": "104"
0920      },
0930      "screen_location": {
0940        "type": "closeUp",
0950        "duration": 2300,
0960        "startTime": 98343,
0970        "startingTransition": 300,
0980        "endingTransition": 300,
0990        "id": "105"
1000      },
1010      "screen_size": {
1020        "type": "zoomIn",
1030        "duration": 300,
1040        "startTime": 58343,
1050        "startingTransition": 300,
1060        "endingTransition": 300,
1070        "id": "106"
1080      }
1090    }
1100  }
```

The effects described in the 3D content metadata presented in Table 1 are now described in further detail. Lines 0010 and 1100 delimit the 3D content metadata as specified in the intervening lines. Lines 0020-0210 delimit 3D content attributes including environment attributes and movie buddy attributes.

Lines 0030-0100 delimit the environment attributes associated with an ocean-themed environment. The environment is named oceanRoom (line 0040) with an identifier of 99 (line 0090). The environment is identified as a room setting (line 0050). The environment is specified as high quality (line 0070) and is in the 3dx file format (line 0080). The 3dx file defining the environment is located at the URL specified in line 0060.

Lines 0110-0200 delimit the movie buddy attributes associated with a movie buddy. The movie buddy is named mybuddy (line 0120) with an identifier of 100 (line 0190). The movie buddy is identified as the default buddy (line 0130). The movie buddy is animated (line 0140) and generates sound (line 0150). The movie buddy is specified as high quality (line 0170) and is in the 3dx file format (line 0180). The 3dx file defining the movie buddy is located at the URL specified in line 0160.

Lines 0220-1090 delimit optical content attributes including color attributes, environment vibration attributes, 3D effects attributes, screen vibration attributes, screen location attributes, and screen size attributes.

Lines 0230-0350 delimit the color attributes for a flashing light effect. The color effect is identified as red flashing lights (line 0240) with an identifier of 101 (line 0340). The red value (line 0250), green value (line 0260), and blue value (line 0270) of the color is specified 255, 0, and 0, respectively. The red flashing lights color effect begins at a time of 234,343 milliseconds in the 2D media content (line 0290) for a duration of 3000 milliseconds (line 0280). The red flashing lights color effect includes a fade in (line 0320) starting at the beginning of the effect until millisecond 500 (line 0330). The red flashing lights color effect also includes a fade out (line 0300) starting at millisecond 2500 (line 0310) until the end of the effect.

Lines 0360-0410 delimit the attributes associated with an environment vibration effect. The environment vibration effect is identified as up and down (line 0370) with an identifier of 103 (line 0400). The up and down environment vibration effect begins at a time of 678,343 milliseconds in the 2D media content (line 0390) for a duration of 2300 milliseconds (line 0380).

Lines 0420-0860 delimit the 3D effects attributes. The 3D effects attribute section includes a single 3D effect (lines 0430 and 0830) with an identifier of 2052377 (line 0850). The 3D effect includes three components (line 0840).

The first component of the 3D effect (lines 0440 and 0560) is identified as a flying cube (line 0450). The flying cube effect is an explosion effect (line 0460) with up and down motion (line 0510). The flying cube moves from a starting XYZ position of 14, 343, 12 (line 0540) to an ending position of 250, 343, 12 (line 0550), indicating that the cube travels in a horizontal (X) direction. The flying cube does not generate new flying cubes during the effect (line 0470). The flying cube effect begins at a time of 678,343 milliseconds in the 2D media content (line 0530) for a duration of 2300 milliseconds (line 0520). The flying cube is specified as low quality (line 0490) and is in the 3dx file format (line 0500). The 3dx file defining the flying cube is located at the URL specified in line 0480.

The second component of the 3D effect (lines 0570 and 0690) is also identified as a flying cube (line 0580). The flying cube effect is an explosion effect (line 0590) with up and down motion (line 0640). The flying cube moves from a starting XYZ position of 12, 43, 12 (line 0670) to an ending position of 150, 343, 12 (line 0680), indicating that the cube travels in both a horizontal (X) and a vertical (Y) direction. The flying cube does not generate new flying cubes during the effect (line 0600). The flying cube effect begins at a time of 678,343 milliseconds in the 2D media content (line 0660) for a duration of 2300 milliseconds (line 0650). The flying cube is specified as low quality (line 0620) and is in the 3dx file format (line 0630). The 3dx file defining the flying cube is located at the URL specified in line 0610.

The third component of the 3D effect (lines 0700 and 0820) is also identified as a flying cube (line 0710). The flying cube effect is an explosion effect (line 0720) with up and down motion (line 0770). The flying cube moves from a starting XYZ position of 22, 343, 12 (line 0800) to an ending position of 250, 343, 12 (line 0810), indicating that the cube travels in a horizontal (X) direction. The flying cube does not generate new flying cubes during the effect (line 0730). The flying cube effect begins at a time of 678,343 milliseconds in the 2D media content (line 0790) for a duration of 2300 milliseconds (line 0780). The flying cube is specified as low quality (line 0750) and is in the 3dx file format (line 0760). The 3dx file defining the flying cube is located at the URL specified in line 0740.

Lines 0870-0920 delimit the vibration attributes associated with a screen vibration effect. The screen vibration effect is identified as side to side (line 0880) with an identifier of 104 (line 0910). The side to side screen vibration effect begins at a time of 678,343 milliseconds in the 2D media content (line 0390) for a duration of 2300 milliseconds (line 0800).

Lines 0930-1000 delimit the location attributes associated with a screen location effect. The screen location effect is identified as close up (line 0940) with an identifier of 105 (line 0990). The close up screen location effect begins at a time of 98,343 milliseconds in the 2D media content (line 0960) for a duration of 2300 milliseconds (line 0950). The close up screen location effect also includes a starting transition of 300 milliseconds (line 0970) and an ending transition of 300 milliseconds (line 0980).

Lines 1010-1080 delimit the size attributes associated with a screen size effect. The screen size effect is identified as zoom in (line 1020) with an identifier of 106 (line 0990). The zoom in screen size effect begins at a time of 58,343 milliseconds in the 2D media content (line 1040) for a duration of 300 milliseconds (line 1030). The zoom in screen size effect also includes a starting transition of 300 milliseconds (line 1050) and an ending transition of 300 milliseconds (line 1060).

In some embodiments, the 2D media content may be prepopulated with certain metadata in advance. In such embodiments, manual or automated processes may be employed for identifying key features of the 2D media content such as actors, soundtracks, locations, and purchasable items. Metadata corresponding to these key features may be generated as a separate metadata file or embedded in the 2D media content. Content metadata collection engine 232 may generate 3D content metadata based on this prepopulated metadata.

Figure 3:
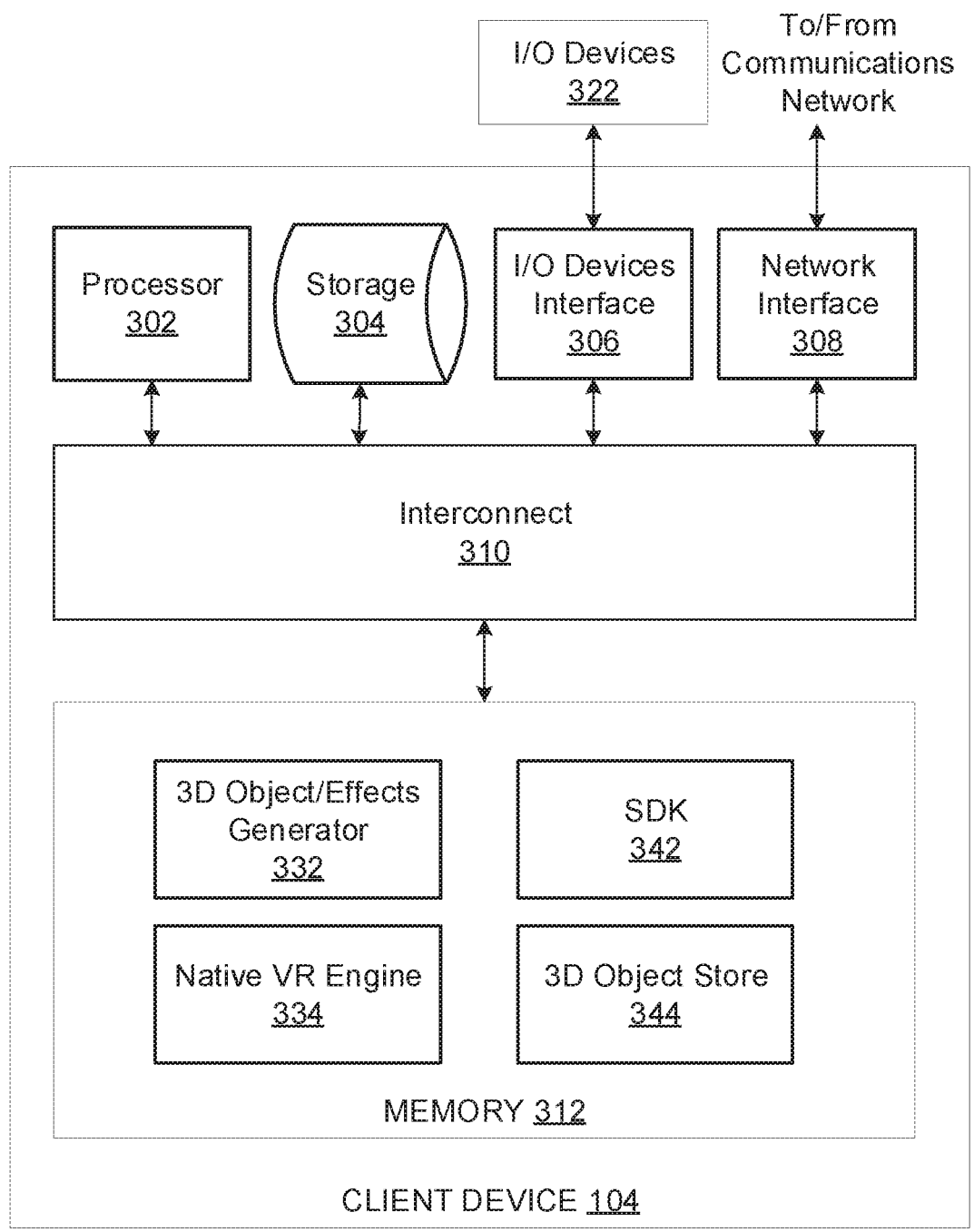
FIG. 3 is a more detailed illustration of the client device of FIG. 1, according to various embodiments of the present invention.

FIG. 3 is a more detailed illustration of the client device 104 of FIG. 1, according to various embodiments of the present invention. As shown in client device 104 includes, without limitation, a central processing unit (CPU) 302, storage 304, an input/output (I/O) devices interface 306, a network interface 308, an interconnect 310, and a system memory 312. Processor 302, storage 304, input/output (I/O) devices interface 306, network interface 308, interconnect 310, and system memory 312 operate substantially the same as the corresponding elements described in conjunction with FIG. 2, except as further described below.

The processor 302 retrieves and executes programming instructions stored in the system memory 312. Similarly, the processor 302 stores and retrieves application data residing in the system memory 312. The interconnect 310 facilitates transmission, such as of programming instructions and application data, between the processor 302, input/output (I/O) devices interface 306, storage 304, network interface 308, and system memory 312. The I/O devices interface 306 is configured to receive input data from user I/O devices 322. Examples of user I/O devices 322 may include one of more buttons, a keyboard, and a mouse or other pointing device. The I/O devices interface 306 may also include an audio output unit configured to generate an electrical audio output signal, and user I/O devices 322 may further include a speaker configured to generate an acoustic output in response to the electrical audio output signal. Another example of a user I/O device 322 is a display device that generally represents any technically feasible means for generating an image for display. For example, the display device could be a liquid crystal display (LCD) display, CRT display, or DLP display. The display device may be a TV that includes a broadcast or cable tuner for receiving digital or analog television signals.

Processor 302 is included to be representative of a single CPU, multiple CPUs, a single CPU having multiple processing cores, and the like. And the system memory 312 is generally included to be representative of a random access memory. The storage 304 may be a disk drive storage device. Although shown as a single unit, the storage 304 may be a combination of fixed and/or removable storage devices, such as fixed disc drives, floppy disc drives, tape drives, removable memory cards, or optical storage, network attached storage (NAS), or a storage area-network (SAN). Processor 302 communicates to other computing devices and systems via network interface 308, where network interface 308 is configured to transmit and receive data via a communications network.

The system memory 312 includes, without limitation, a 3D object/effects generator 332, a native VR engine 334, a system development kit (SDK) 342, and 3D object store 344. The 3D object/effects generator 332 and native VR engine 334, when executed by the processor 302, performs one or more operations associated with client device 104 of FIG. 1, as further described herein.

In operation, 3D object/effects generator 332 receives 2D media content along with associated 3D content metadata and 3D objects. Based on this received information, 3D object/effects generator 332 generates a 3D virtual environment for the user to experience and navigate while viewing the 2D media content. 3D object/effects generator 332 further generates a virtual movie buddy to accompany the user and to interact with the user. The 3D virtual environment includes a virtual screen upon which the 2D media content is displayed. The 3D virtual environment may be dynamic and may be changed based on one or more of user input and the 3D content metadata. For example, when the user is viewing a movie with an undersea theme, 3D object/effects generator 332 could generate an underwater environment as the 3D virtual environment. Similarly, when the user is viewing a story about a boy and his toys, 3D object/effects generator 332 could generate the boy's bedroom as the 3D virtual environment.

Similarly, the movie buddy may be dynamic and may be changed based on one or more of user input and the 3D content metadata. For example, the user could choose a favorite character, such as the user's favorite cartoon character, as a default movie buddy. In addition or alternatively, the 3D content metadata may identify a movie buddy that is specific to the 2D media content, such as a character from the currently selected 2D media content. For example, when the user is viewing a movie about a boy and his toys, 3D object/effects generator 332 could generate one of the toys as the movie buddy. Similarly, when the user is viewing a movie about a group of superheroes, 3D object/effects generator 332 could generate one of the superheroes as the movie buddy. If neither the user nor the 3D content metadata have specified a movie buddy, then 3D object/effects generator 332 selects a generic or default movie buddy.

In some embodiments, 3D object/effects generator 332 may detect when the user interacts with the movie buddy. 3D object/effects generator 332 detects sound uttered by thee user via a microphone associated with VR headset 106. In addition or alternatively, 3D object/effects generator 332 detects movement of the user via accelerometers, gyroscopes, or other motion sensors associated with VR headset 106. In addition or alternatively, 3D object/effects generator 332 detects input from the user via any other technically feasible approach. In response, 3D object/effects generator 332 may animate the movie buddy gesture to the user or say something to the user about the 2D media content.

As further described herein, the user may access various GUI controls to turn the movie buddy on or off, turn the environment on or off, select a different movie buddy or environment, select whether the movie buddy animates or speaks, or select an option where the movie buddy and environment are selected based on the 2D media content being viewed.

3D object/effects generator 332 further generates various 3D effects at set time markers as specified by an appropriate time code. The time code could be in any technically feasible format. For example, the virtual screen could change in size and location. During a particularly intense scene, the virtual screen could move closer to eh user and then move back when the scene completes. During a scene that includes an explosion, the 3D virtual environment and virtual screen could vibrate.

3D object/effects generator 332 further generates 3D objects that move throughout the 3D virtual environment at set time markers as specified by an appropriate time code. The time code could be in any technically feasible format. 3D object/effects generator 332 stores the generated 3D objects in 3D object store 344. For example, during a scene in the 2D media content where an explosion occurs, 3D object/effects generator 332 could generate virtual flying debris that travels through the 3D virtual environment. Similarly, during a scene in the 2D media content where a flood occurs, 3D object/effects generator 332 could generate a flooding effect that fills the 3D virtual environment with water. During a scene in the 2D media content that includes flying insects, 3D object/effects generator 332 could generate virtual flying insects that fly around in the 3D virtual environment.

Via the techniques described herein, 3D object/effects generator 332 generates a dynamic 3D VR environment by generating, changing, and animating objects within the environment based on the 2D media content. In some embodiments, 3D object/effects generator 332 may generate objects locally or retrieve models of the object from 3D object database 108 based on the condition of an object location flag in the 3D content metadata. If the object location flag indicates that the object is available locally, then 3D object/effects generator 332 generates the object locally and directly. If, however, the object location flag indicates that the object is available remotely, then 3D object/effects generator 332 retrieves the objects from 3D object database 108.

Upon generating the elements for display, including the virtual environment, virtual screen, movie buddy, and other 3D objects and effects, 3D object/effects generator 332 accesses SDK 342. Via SDK 342, 3D object/effects generator 332 translates the elements into a format that is native to VR headset 106. Because different VR devices and platforms have different VR engines, SDK 342 is specific to a particular VR device or platform. Different VR devices and platforms, therefore, have different SDKs 342. Correspondingly, a particular SDK 342 integrates with the native VR programming interface for the corresponding VR device or platform. SDK 342 requests previously generated 3D objects from one or both of 3D object store 344 and 3D object database 108. SDK 342 generates the 3D virtual environment and displays the 2D media content on the virtual screen within the environment. In some embodiments, SDK 342 may generate and animate simple 3D objects that are specified in the 3D content metadata.

After translating the elements into the native format of VR headset 106, 3D object/effects generator 332 transmits the translated elements to native VR engine 334. In operation, native VR engine 334 transmits the translated elements to VR headset 106. VR headset 106 then displays the translated elements. In this manner, a VR headset 106 with a different native format may perform the techniques described herein by providing a different SDK 342 that supports the other native format. As a result, the capabilities of 3D object/effects generator 332 and VR headset 106 capabilities may be enhanced with new features over time, and client device is capable of supporting the new features.

Figure 4B:
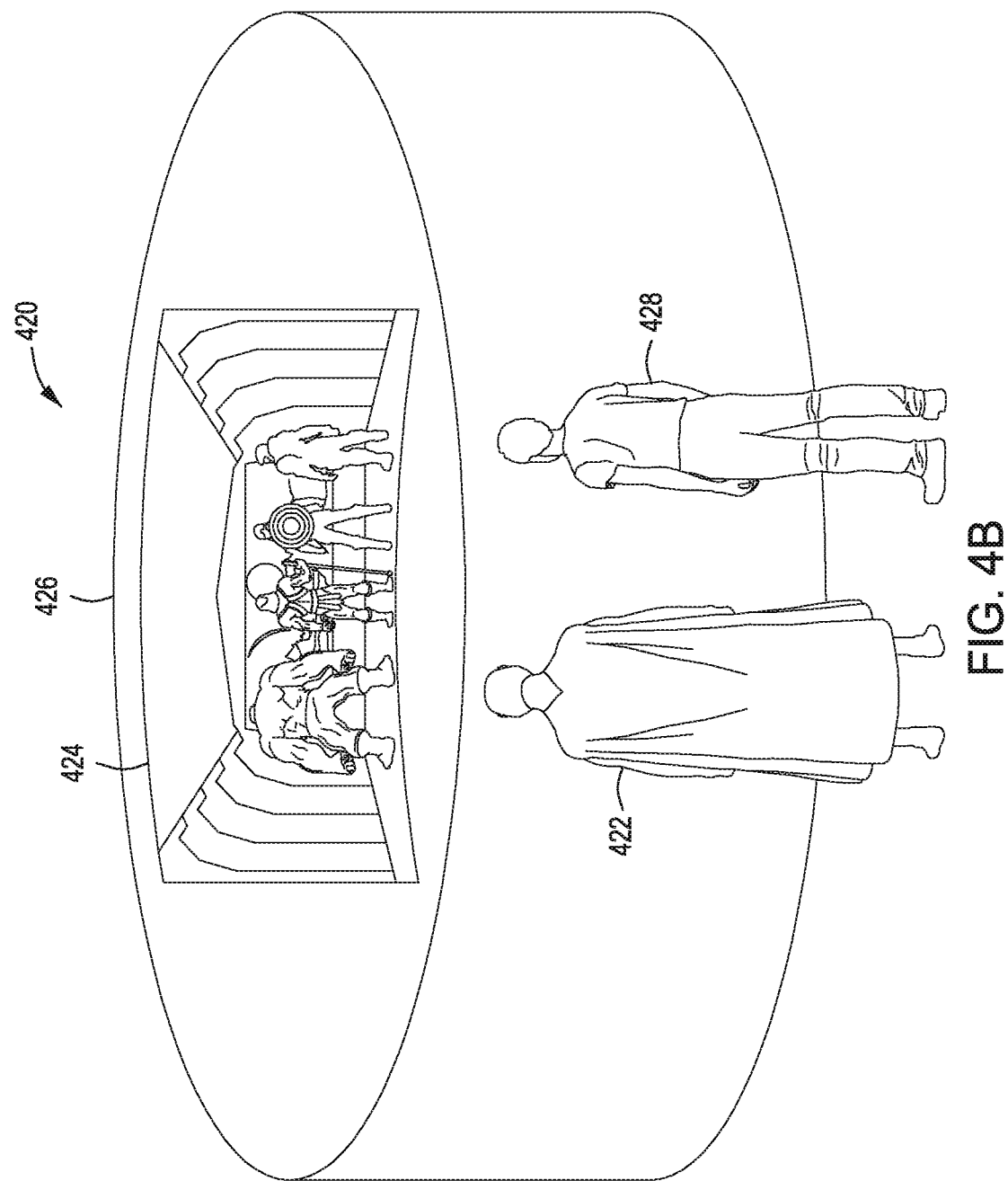

FIGS. 4A-4D illustrate various examples of an immersive VR environment generated by the system of FIG. 1, according to various embodiments of the present invention. As shown in FIG. 4A, an immersive VR environment 400 includes a generic 3D virtual environment 406. A virtual screen 404 displays 2D media content featuring two cartoon characters. A user 402 experiences the 3D virtual environment 406 and views the virtual screen 404 with a movie buddy 408 in the form of a cartoon character.

As shown in FIG. 4B, an immersive VR environment 420 includes a generic 3D virtual environment 426. A virtual screen 424 displays 2D media content featuring a scene that includes an explosion. A user 428 experiences the 3D virtual environment 426 and views the virtual screen 424 with a movie buddy 422 in the form of a supervillain. As shown in FIG. 4C, an immersive VR environment 440 includes a generic 3D virtual environment 446. 3D object/effects generator 332 generates 3D particles and animates the 3D particles to fly from the virtual screen towards the user.

Consequently, the 3D virtual environment 446 includes flying debris 450 and 452 in the form 3D objects to the left and right of the virtual screen 444, respectively. A user 448 experiences the 3D virtual environment 446 and views the virtual screen 444 with a movie buddy 442 in the form of the supervillain.

Figure 4D:
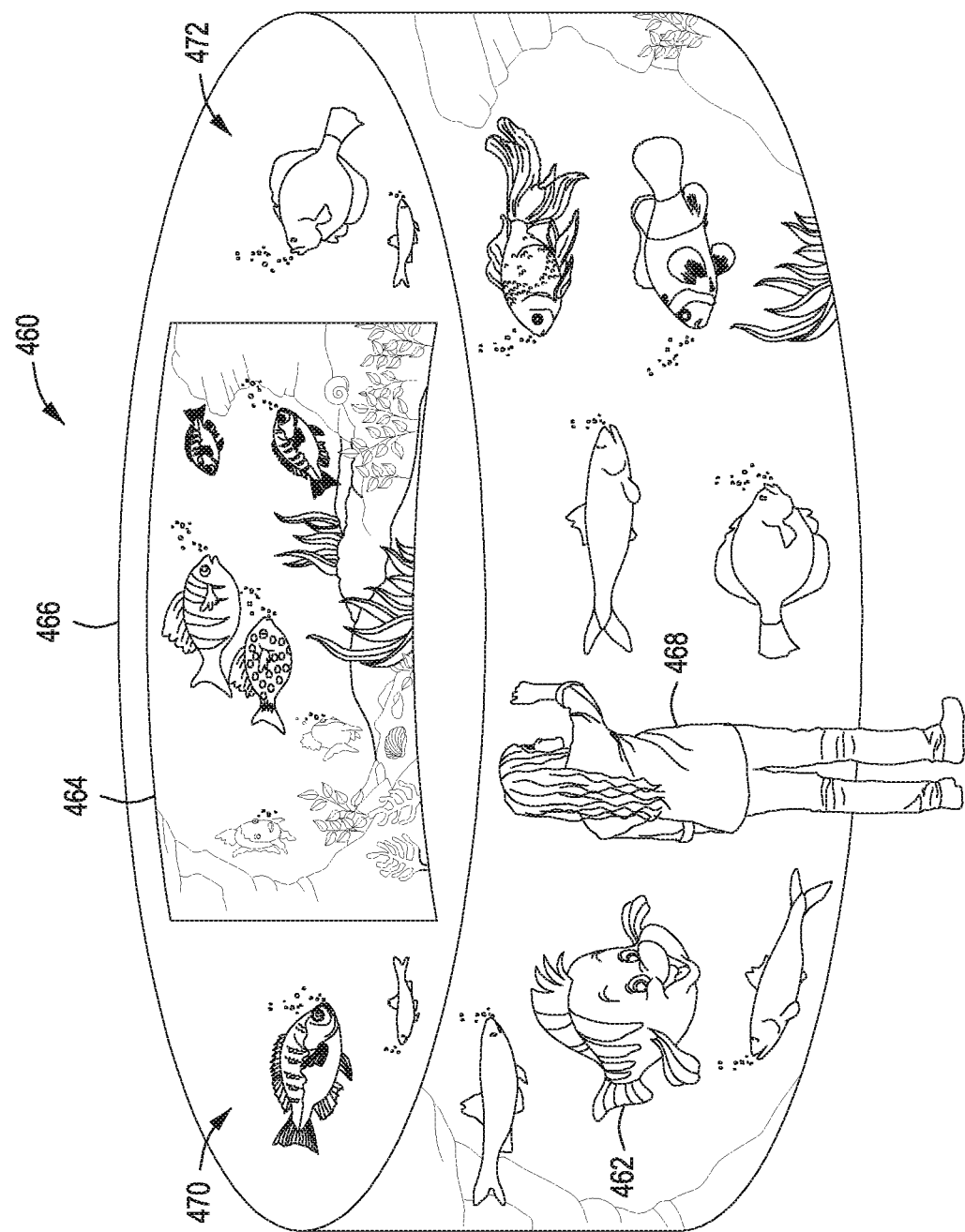

As shown in FIG. 4D, an immersive VR environment 460 includes a 3D virtual environment 466 with an underwater theme. A virtual screen 464 displays 2D media content featuring an underwater scene. 3D visual elements 470 and 472 consistent with the underwater theme travel through the 3D virtual environment 466 to the left and right of the virtual screen 464, respectively. A user 468 experiences the 3D virtual environment 466 and views the virtual screen 464 with a movie buddy 462 in the form of an aquatic cartoon character.

Figure 5A:
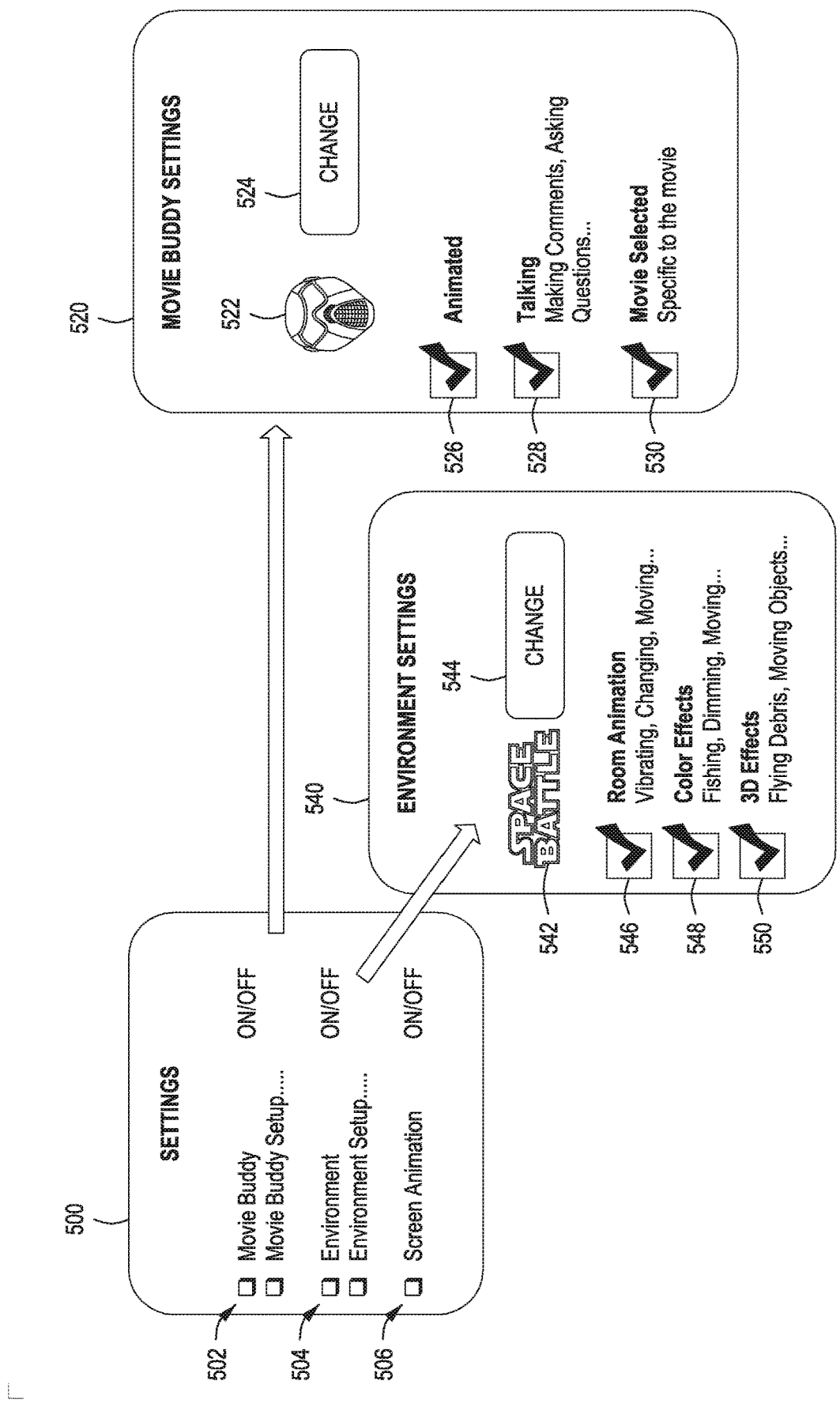
FIGS. 5A-5C illustrate example graphical user interface (GUI) screens for customizing the immersive VR environment generated by the system of FIG. 1, according to various embodiments of the present invention.
Figure 5B:
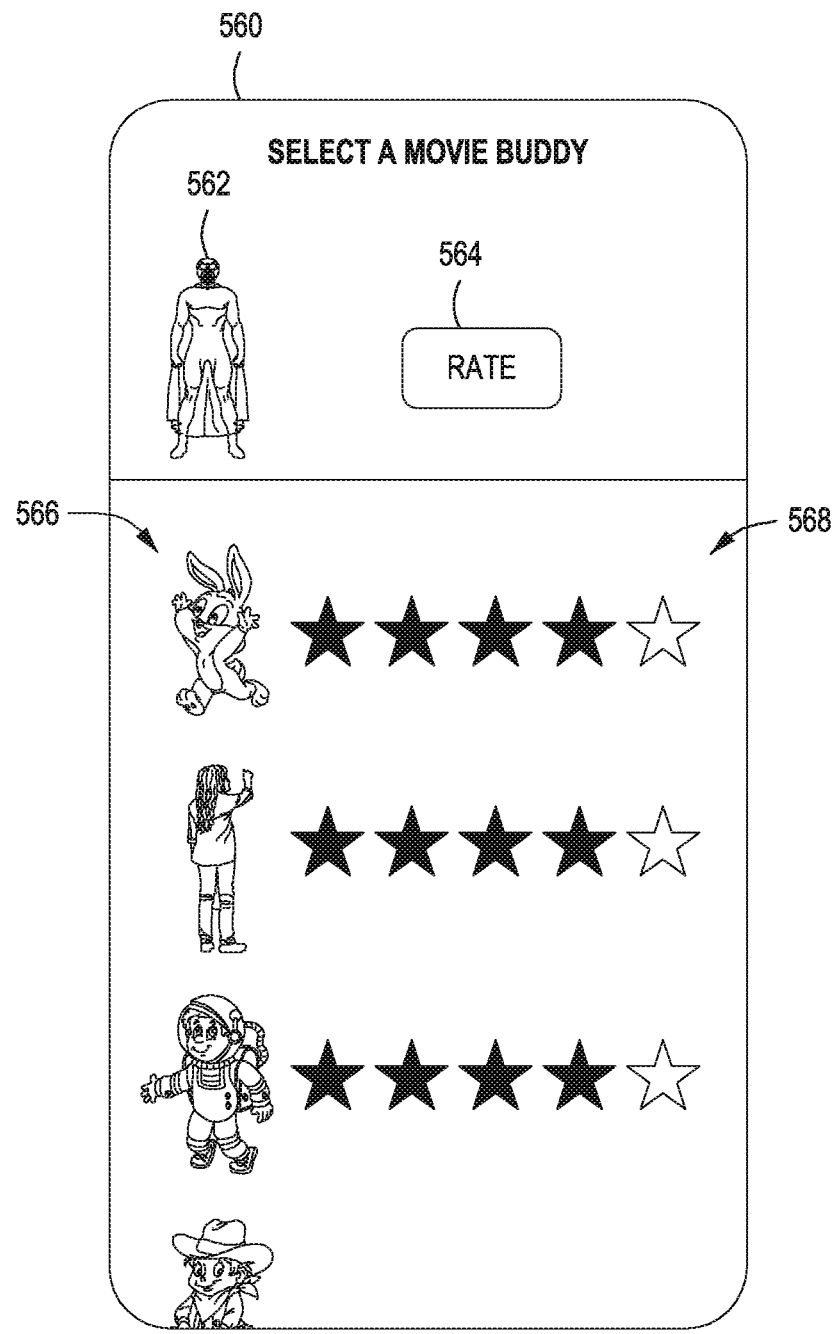
Figure 5C:
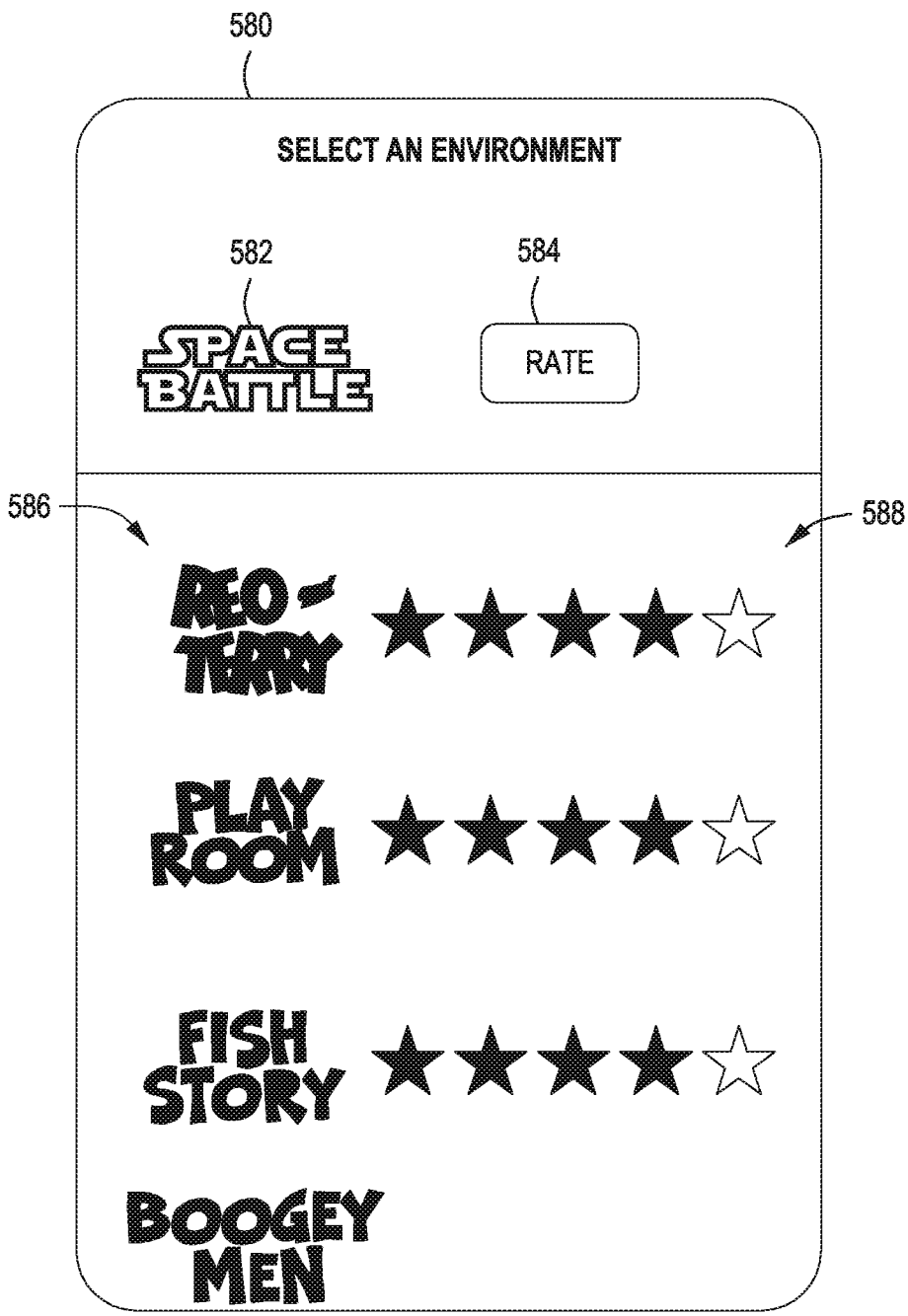

FIGS. 5A-5C illustrate example graphical user interface (GUI) screens for customizing the immersive VR environment generated by the system of FIG. 1, according to various embodiments of the present invention.

As shown in FIG. 5A, the GUI screens include a settings menu 500, a movie buddy settings menu 520, and an environment settings 540 menu. The settings menu 500 includes a movie buddy section 502, an environment section 504 and a screen animation section 506. The movie buddy section 502 includes a control for turning the movie buddy on or off to enable or disable the movie buddy, respectively. The movie buddy section 502 also includes a control for accessing the movie buddy settings menu 520. The environment section 504 includes a control for turning the environment buddy on or off to enable or disable the environment, respectively. The environment section 504 also includes a control for accessing the environment settings menu 540.

The movie buddy settings menu 520 is accessed via the movie buddy section 502 of the settings menu 500. The movie buddy settings menu 520 indicates that the currently selected movie buddy 522 is a supervillain. When selected, the change button 524 accesses the select a movie buddy menu 560, as further described herein. An animated control 526 enables or disables whether the movie buddy is animated. A talking control 526 determines whether the movie buddy is enabled or disabled to talk, such as making comments, asking questions, and so on. A movie selected control 530 enables or disables selection of the movie buddy based on the specific 2D media content currently being displayed.

The environment settings menu 540 is accessed via the environment section 504 of the settings menu 500. The environment settings menu 520 indicates that the currently selected environment 542 is a science fiction theme. When selected, the change button 544 accesses the select an environment menu 580, as further described herein. A room animation control 526 enables or disables whether the environment is animated with certain effects, such as vibrating, changing color, or moving. A color effects control 548 enables or disables certain color effects within the environment, such as flashing, dimming, moving, and so on. A 3D effects control 548 enables or disables certain 3D object effects within the environment, such as flying debris, moving objects, and so on.

As shown in FIG. 5B, the select a movie buddy menu 560 is accessed via the change button 524 of the movie buddy settings menu 520. The select a movie buddy menu 560 indicates that the currently selected movie buddy 562 is a supervillain. When selected, the rate button 564 accesses a rating menu (not shown) where the user can enter a rating for the currently selected movie buddy 562. The available movie buddy section 566 illustrates the movie buddies that are available for selection. The ratings section 568 illustrates the rating for each of the available movie buddies.

As shown in FIG. 5C, the select an environment menu 580 is accessed via the change button 544 of the environment settings menu 540. The select an environment menu 580 indicates that the currently selected environment 582 is a science fiction theme. When selected, the rate button 584 accesses a rating menu (not shown) where the user can enter a rating for the currently selected environment 582. The available environment section 586 illustrates the environments that are available for selection. The ratings section 588 illustrates the rating for each of the available environments.

Figure 6A:
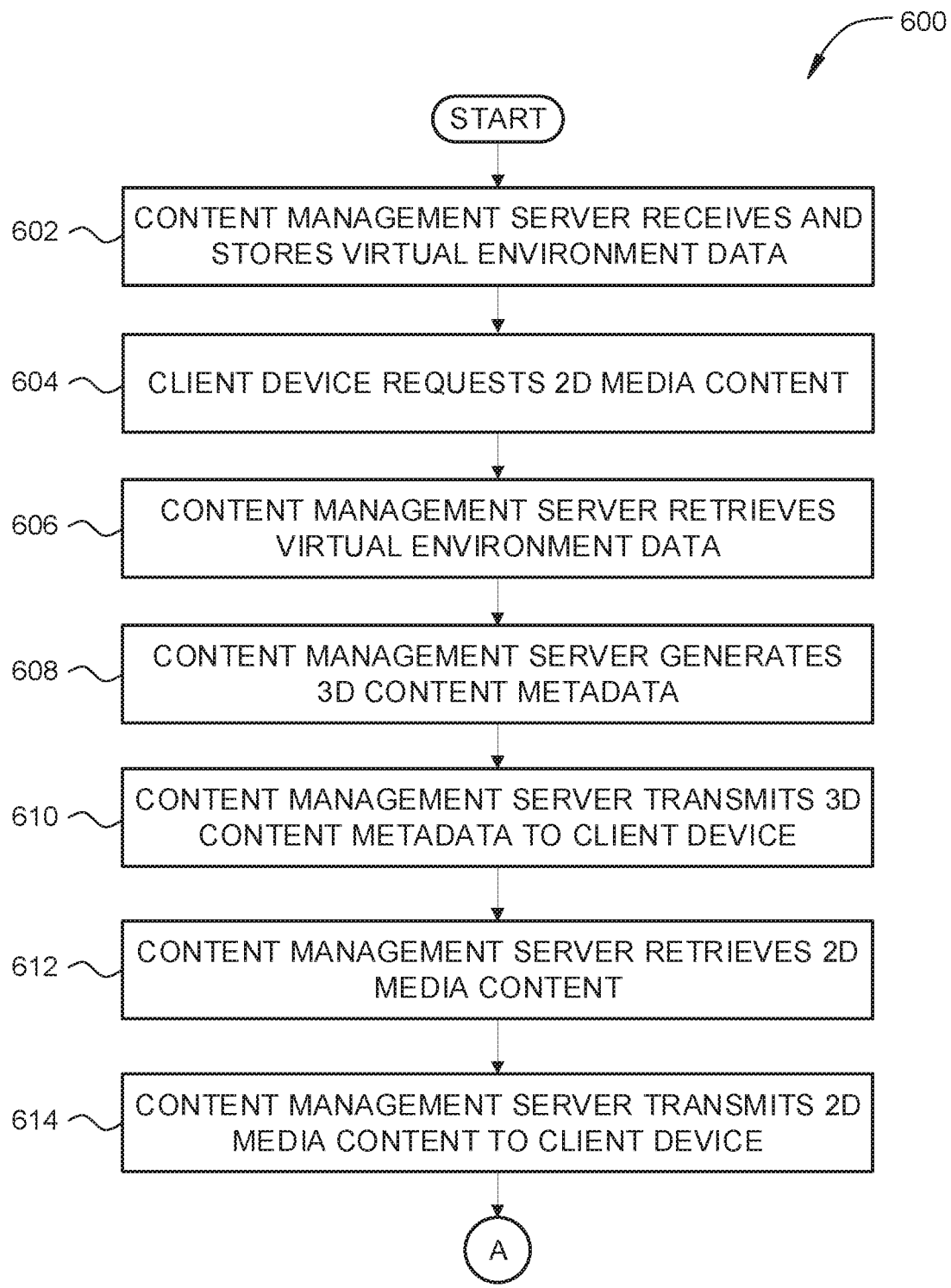
FIGS. 6A-6C set forth a flow diagram of method steps for generating an immersive VR environment, according to various embodiments of the present invention.
Figure 6B:
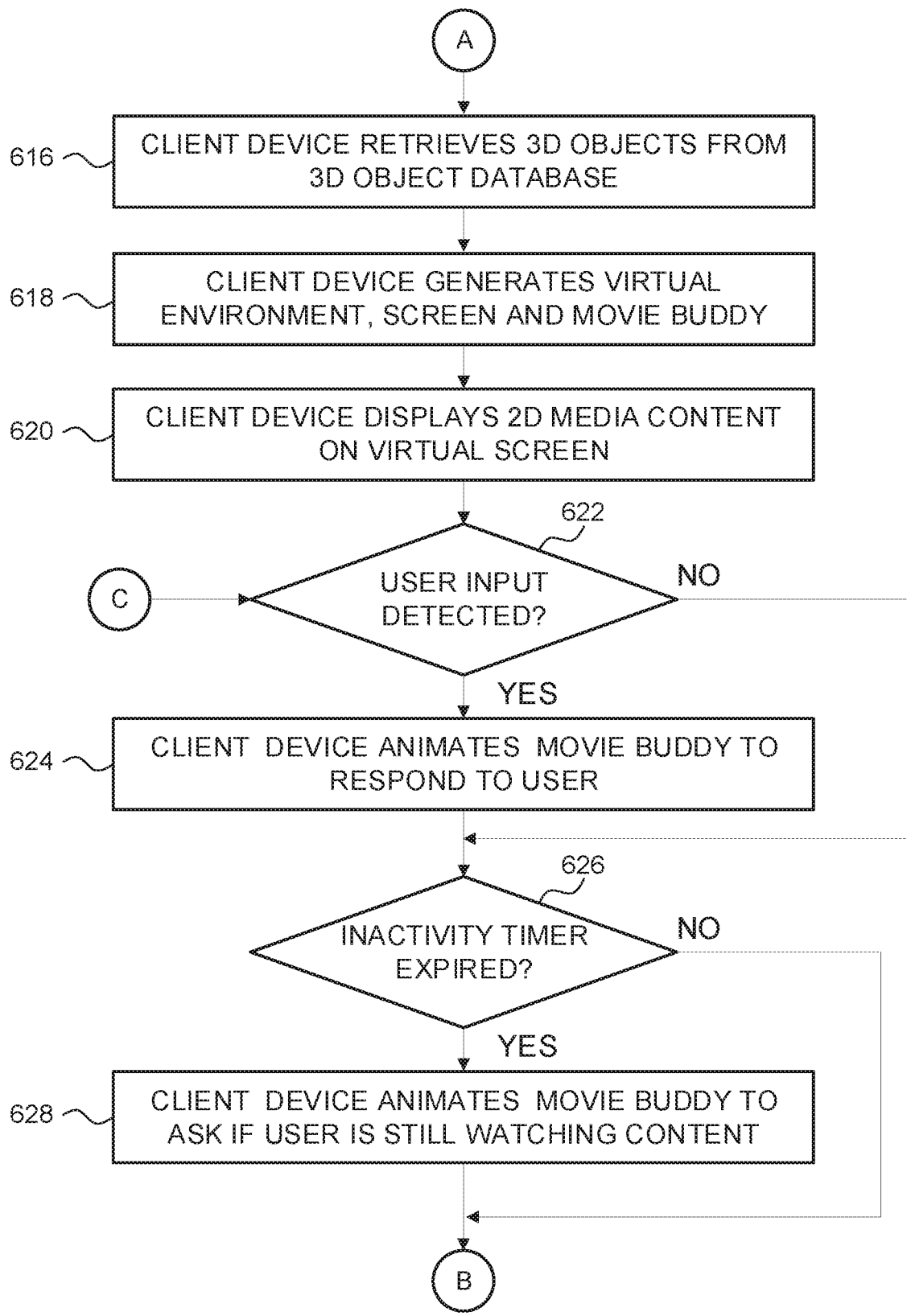
Figure 6C:
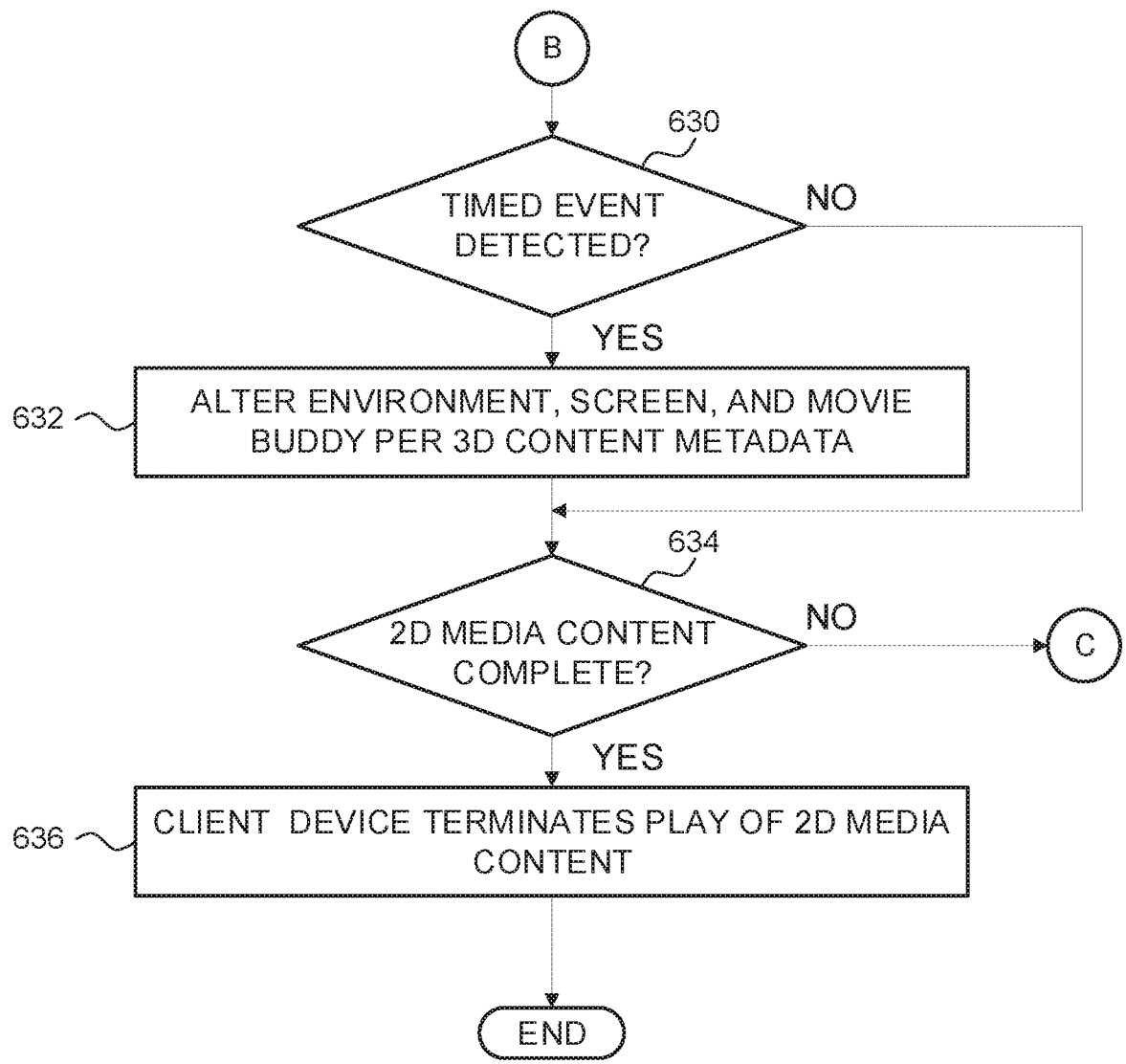

FIGS. 6A-6C set forth a flow diagram of method steps for generating an immersive VR environment, according to other various embodiments of the present invention. Although the method steps are described in conjunction with the systems of FIGS. 1-5C, persons of ordinary skill in the art will understand that any system configured to perform the method steps, in any order, is within the scope of the present invention.

As shown, a method 600 begins at step 602, where content metadata collection engine 232 executing on content management server 102 receives and stores virtual environment data associated with a particular item of 2D media content, such as a movie, television program, or other video content. In some embodiments, content management server 102 may receive the virtual environment data from a user, such as a production assistant or post-production assistant. The user may enter the virtual environment data via a graphical user interface (GUI), an electronic form, or via any other technically feasible approach. The virtual environment data includes information that refers to the 2D media content as a whole, such as a description of the virtual environment and the movie buddy associated with the movie. The virtual environment data also includes information regarding effects that occur at particular points in time during the movie, including, without limitation, color effects, 3D object effects, environment vibration effects, and screen size, location, and vibration effects.

At step 604, 3D objects/effects generator 332 executing on client device 104 requests a particular 2D media content item. At step 606, content metadata collection engine 232 retrieves the virtual environment data. At step 608, content metadata collection engine 232 generates 3D content metadata based on the virtual environment data. At step 610, content metadata collection engine 232 transmits the 3D content metadata to client device 104. At step 612, content metadata collection engine 232 retrieves the 2D media content. At step 614, content metadata collection engine 232 transmits the 2D media content to client device 104.

At step 616, 3D object/effects generator 332 retrieves 3D objects from 3D object database as specified by the 3D content metadata. At step 618, 3D objects/effects generator 332 generates the 3D virtual environment, virtual screen and movie buddy. The user could select the 3D virtual environment and movie buddy, such as a favorite character and environment, as default selections. In addition or alternatively, the 3D content metadata may identify an environment and a movie buddy that is specific to the 2D media content, such as an environment and a character from the currently selected 2D media content. If neither the user nor the 3D content metadata have specified an environment and a movie buddy, then 3D object/effects generator 332 selects a generic or default environment and movie buddy.

At step 620, 3D object/effects generator 332 displays the 2D media content on the virtual screen. At step 622, 3D object/effects generator 332 determines whether user input is detected. For example, 3D object/effects generator 332 could detect that the user has said something to the movie buddy or has turned to look at the movie buddy. If 3D object/effects generator 332 has not detected user input, then the method proceeds to step 626, described below. If, however, 3D object/effects generator 332 has detected user input, then the method proceeds to step 624, where 3D object/effects generator 332 animates the movie buddy to respond to the user. For example, the movie buddy could speak to the user or nod his or her head at the user.

At step 626, 3D object/effects generator 332 determines whether an inactivity timer has expired. For example, 3D object/effects generator 332 could determine, via an inactivity timer, that no user activity has been detected for thirty minutes. If the inactivity timer has not expired, then the method proceeds to step 630, described below. If, however, the inactivity timer has expired, then the method proceeds to step 628, where 3D object/effects generator 332 animates the movie buddy to ask the user if he or she is still watching the 2D media content. 3D object/effects generator 332 could then continue playing the 2D media content or terminate play as appropriate.

At step 630, 3D object/effects generator 332 determines whether a timed event is detected. For example, 3D object/effects generator 332 could detect that the current time of the 2D media content is associated with one or more effects, such as a color, location, size, or vibration effect or an effect for animated objects traveling within the 3D virtual environment. If 3D object/effects generator 332 has not detected a timed event, then the method proceeds to step 634, described below. If, however, 3D object/effects generator 332 has detected a timed event, then the method proceeds to step 632, where 3D object/effects generator 332 alters the 3D virtual environment, virtual screen, and movie buddy according to the 3D content metadata. For example, 3D object/effects generator 332 could change the color of the environment, the size and location of the virtual screen, and the vibration of the virtual screen and the environment. In addition or alternatively, 3D object/effects generator 332 could generate and display 3D objects, such as flying debris, that travel through the 3D virtual environment.

At step 634, 3D object/effects generator 332 determines whether playback of the 2D media content is complete. If playback of the 2D media content is not complete, then the method proceeds to step 622, described above. If playback of the 2D media content is complete, then the method proceeds to step 636, where 3D object/effects generator 332 terminates play of the 2D media content. 3D object/effects generator 332 may then take other appropriate actions, including, without limitation, fading the 3D virtual environment to black, animating the movie buddy to wave goodbye and walk away, and displaying a default visual effect. The method 600 then terminates.

In sum, techniques are disclosed for generating an immersive and interactive 3D virtual environment that includes 2D media content, such as movies, television programs, and other video content. When viewing such 2D media content through a VR headset, 3D elements are generated and displayed as well, thereby presenting the 2D media content as if the content was originally created for a 3D VR environment.

Further, the techniques include capabilities to customize the 3D virtual environment. For example, the 3D virtual environment could include a movie buddy to "watch" the 2D movie content along with the user. The movie buddy may be selected by the user. Alternatively, if the user does not choose a movie buddy, a content-specific movie buddy is recommended based on the particular 2D media content being viewed. The movie buddy will notify the user of any errors and otherwise "interact" with the user in an effort to increase guest engagement. For example, the movie buddy could ask the user if he or she is still watching the 2D media content. In response, the user could nod or shake his or her head in response.

Further, the techniques include generating a more immersive environment when the user is viewing 2D media content. Again, the environment may be selected by the user or automatically selected based on the 2D media content. In one example, if the guest is watching a movie about undersea creatures, the environment could be changed to an underwater scene so the guest is watching the content under the sea. In another example, if the user is viewing a science fiction movie, the environment could be changed to simulate viewing the movie from within a spaceship. In addition, the environment dynamically changes as the scene of the 2D media content changes. For example, if the 2D media content includes an explosion on screen, the environment dynamically reacts accordingly. For example, the scene could get darker to amplify the visuals or flying debris could be displayed in the 3D virtual environment. In this manner, 2D media content is augmented with dynamically generated 3D virtual elements.

At least one advantage of the disclosed techniques is that 2D media content, when viewed via a VR headset, is more interactive and customizable relative to prior approaches. More particularly, by presenting appropriate 3D elements in the VR environment and providing customized selections of different aspects of the VR environment, the user experience is more immersive and unique relative to prior approaches. As a result, the user has the experience of being "inside" the 2D media content rather than just viewing the content from an "outsider's" perspective. These advantages represent one or more technological improvements over the prior art.

1. In some embodiments, a computer-implemented method for generating a three-dimensional virtual environment includes receiving a media content item, receiving content metadata associated with the media content item, generating at least a portion of a 3D virtual environment based on the content metadata, and displaying the media content item and the at least a portion of the 3D virtual environment on a display associated with a virtual reality device.

2. The computer-implemented method according to clause 1, wherein the content metadata includes an environment effect, and wherein generating the at least a portion of the 3D virtual environment based on the content metadata comprises receiving a first parameter that includes at least one of an environment type and a uniform resource locater (URL) associated with the environment, and applying the environment effect to the at least a portion of the 3D virtual environment based on the first parameter.

3. The computer-implemented method according to clause 1 or clause 2, wherein the content metadata includes a movie buddy effect, and wherein generating the at least a portion of the 3D virtual environment based on the content metadata comprises receiving a first parameter that includes at least one of a movie buddy type and a uniform resource locater (URL) associated with the movie buddy, and applying the movie buddy effect to the at least a portion of the 3D virtual environment based on the first parameter.

4. The computer-implemented method according to any of clauses 1-3, wherein the content metadata includes a color effect, and wherein generating the at least a portion of the 3D virtual environment based on the content metadata comprises receiving a first parameter that includes at least one of a color value and a starting time, and applying the color effect to the at least a portion of the 3D virtual environment based on the first parameter.

5. The computer-implemented method according to any of clauses 1-4, wherein the content metadata includes a screen size effect, and wherein generating the at least a portion of the 3D virtual environment based on the content metadata comprises receiving a first parameter that includes at least one of a size type and a starting time, and applying the screen location effect to a virtual screen to include in the at least a portion of the 3D virtual environment based on the first parameter.

6. The computer-implemented method according to any of clauses 1-5, wherein the content metadata includes a three-dimensional (3D) object effect, and wherein generating the at least a portion of the 3D virtual environment based on the content metadata comprises receiving a first parameter that includes at least one of an effect type, a starting time, a duration, and a uniform resource locater (URL) associated with the 3D object effect, and applying the 3D object effect to a 3D object to include in the at least a portion of the 3D virtual environment based on the first parameter.

7. The computer-implemented method according to any of clauses 1-6, wherein the at least a portion of the 3D virtual environment includes a virtual screen, and wherein displaying the media content item includes overlaying the media content item on the virtual screen.

8. The computer-implemented method according to any of clauses 1-7, wherein the at least a portion of the 3D virtual environment includes a 3D object that is related to the media content item.

9. The computer-implemented method according to any of clauses 1-8, further comprising receiving a description of the at least a portion of a 3D virtual environment in a first format, and translating the description of the at least a portion of a 3D virtual environment into a second format that is native to the virtual reality device.

10. In some embodiments, a non-transitory computer-readable storage medium includes instructions that, when executed by a processor, cause the processor to generate a three-dimensional virtual environment, by performing the steps of receiving a media content item, receiving content metadata associated with the media content item, generating at least a portion of a 3D virtual environment based on the content metadata, and displaying the media content item and the at least a portion of the 3D virtual environment on a display associated with a virtual reality device.

11. The non-transitory computer-readable storage medium according to clause 10, wherein the content metadata includes an environment effect, and wherein generating the at least a portion of the 3D virtual environment based on the content metadata comprises receiving a first parameter that includes at least one of an environment type and a uniform resource locater (URL) associated with the environment, and applying the environment effect to the at least a portion of the 3D virtual environment based on the first parameter.

12. The non-transitory computer-readable storage medium according to clause 10 or clause 11, wherein the content metadata includes a movie buddy effect, and wherein generating the at least a portion of the 3D virtual environment based on the content metadata comprises receiving a first parameter that includes at least one of a movie buddy type and a uniform resource locater (URL) associated with the movie buddy, and applying the movie buddy effect to the at least a portion of the 3D virtual environment based on the first parameter.

13. The non-transitory computer-readable storage medium according to any of clauses 10-12, wherein the content metadata includes a color effect, and wherein generating the at least a portion of the 3D virtual environment based on the content metadata comprises receiving a first parameter that includes at least one of a color value and a starting time, and applying the color effect to the at least a portion of the 3D virtual environment based on the first parameter.

14. The non-transitory computer-readable storage medium according to any of clauses 10-13, wherein the content metadata includes an environment vibration effect, and wherein generating the at least a portion of the 3D virtual environment based on the content metadata comprises receiving a first parameter that includes at least one of a motion type and a starting time, and applying the environment vibration effect to the at least a portion of the 3D virtual environment based on the first parameter.

15. The non-transitory computer-readable storage medium according to any of clauses 10-14, wherein the content metadata includes a screen vibration effect, and wherein generating the at least a portion of the 3D virtual environment based on the content metadata comprises receiving a first parameter that includes at least one of a motion type and a starting time, and applying the screen vibration effect to a virtual screen included in the at least a portion of the 3D virtual environment based on the first parameter.

16. The non-transitory computer-readable storage medium according to any of clauses 10-15, wherein the content metadata includes a screen location effect, and wherein generating the at least a portion of the 3D virtual environment based on the content metadata comprises receiving a first parameter that includes at least one of a location type and a starting time, and applying the screen location effect to a virtual screen to include in the at least a portion of the 3D virtual environment based on the first parameter.

17. The non-transitory computer-readable storage medium according to any of clauses 10-16, wherein the content metadata includes a screen size effect, and wherein generating the at least a portion of the 3D virtual environment based on the content metadata comprises receiving a first parameter that includes at least one of a size type and a starting time, and applying the screen location effect to a virtual screen to include in the at least a portion of the 3D virtual environment based on the first parameter.

18. The non-transitory computer-readable storage medium according to any of clauses 10-17, wherein the content metadata includes a three-dimensional (3D) object effect, and wherein generating the at least a portion of the 3D virtual environment based on the content metadata comprises receiving a first parameter that includes at least one of an effect type, a starting time, a duration, and a uniform resource locater (URL) associated with the 3D object effect, and applying the 3D object effect to a 3D object to include in the at least a portion of the 3D virtual environment based on the first parameter.

19. In some embodiments, a computing device, comprises a memory that includes an three-dimensional (3D) object/effects generator, and a processor that is coupled to the memory and, when executing the 3D object/effects generator, is configured to: receive a media content item from a content management server, receive, from the content management server, content metadata associated with the media content item, and generate at least a portion of a 3D virtual environment based on the content metadata.

20. The computing device according to clause 19, wherein the processor, when executing the 3D object/effects generator, is further configured to receive a description of the at least a portion of a 3D virtual environment in a first format, and translate the description of the at least a portion of a 3D virtual environment into a second format that is native to the virtual reality device, and wherein the memory further includes a native virtual reality engine, and the processor, when executing the native virtual reality engine, is configured to display, via the second format, the media content item and the at least a portion of the 3D virtual environment on a display associated with a virtual reality device.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating a three-dimensional (3D) virtual environment, the method comprising:
    receiving a media content item;
    receiving content metadata associated with the media content item, wherein the content metadata specifies a character effect in which a character watches the media content item in a 3D virtual environment and, while watching the media content item, automatically interacts with a user in the 3D virtual environment by at least one of providing commentary about the media content item to the user, asking the user a question, or responding to the user based on at least one of a sound, a movement, or an input by the user;
    generating at least a portion of the 3D virtual environment based on the content metadata; and
    displaying the media content item and the at least a portion of the 3D virtual environment on a display associated with a virtual reality device.

2. The computer-implemented method of claim 1, wherein the content metadata further specifies an environment effect, and wherein generating the at least a portion of the 3D virtual environment based on the content metadata comprises:
    receiving a first parameter that includes at least one of an environment type or a uniform resource locator (URL) associated with the at least a portion of the 3D virtual environment; and
    applying the environment effect to the at least a portion of the 3D virtual environment based on the first parameter.

3. The computer-implemented method of claim 1, wherein generating the at least a portion of the 3D virtual environment based on the content metadata comprises:
    receiving a first parameter that includes at least one of a character type or a uniform resource locator (URL) associated with the character effect; and
    applying the character effect to the at least a portion of the 3D virtual environment based on the first parameter.

4. The computer-implemented method of claim 1, wherein the content metadata further specifies a color effect, and wherein generating the at least a portion of the 3D virtual environment based on the content metadata comprises:
    receiving a first parameter that includes at least one of a color value or a starting time; and
    applying the color effect to the at least a portion of the 3D virtual environment based on the first parameter.

5. The computer-implemented method of claim 1, wherein the content metadata further specifies a screen size effect, and wherein generating the at least a portion of the 3D virtual environment based on the content metadata comprises:
    receiving a first parameter that includes at least one of a size type or a starting time; and
    applying the screen size effect to a virtual screen included in the at least a portion of the 3D virtual environment based on the first parameter.

6. The computer-implemented method of claim 1, wherein the content metadata further specifies a 3D object effect, and wherein generating the at least a portion of the 3D virtual environment based on the content metadata comprises:
    receiving a first parameter that includes at least one of an effect type, a starting time, a duration, or a uniform resource locater (URL) associated with the 3D object effect; and
    applying the 3D object effect to a 3D object included in the at least a portion of the 3D virtual environment based on the first parameter.

7. The computer-implemented method of claim 1, wherein the at least a portion of the 3D virtual environment includes a virtual screen, and wherein displaying the media content item includes overlaying the media content item on the virtual screen.

8. The computer-implemented method of claim 1, wherein the at least a portion of the 3D virtual environment includes a 3D object that is related to the media content item.

9. The computer-implemented method of claim 1, further comprising:
    receiving a description of the at least a portion of the 3D virtual environment in a first format; and
    translating the description of the at least a portion of the 3D virtual environment into a second format that is native to the virtual reality device.

10. A non-transitory computer-readable storage medium including instructions that, when executed by a processor, cause the processor to generate a three-dimensional (3D) virtual environment, by performing the steps of:
    receiving a media content item;
    receiving content metadata associated with the media content item, wherein the content metadata specifies a character effect in which a character watches the media content item in a 3D virtual environment and, while watching the media content item, automatically interacts with a user in the 3D virtual environment by at least one of providing commentary about the media content item to the user, asking the user a question, or responding to the user based on at least one of a sound, a movement, or an input by the user;
    generating at least a portion of the 3D virtual environment based on the content metadata; and displaying the media content item and the at least a portion of the 3D virtual environment on a display associated with a virtual reality device.

11. The non-transitory computer-readable storage medium of claim 10, wherein the content metadata further specifies an environment effect, and wherein generating the at least a portion of the 3D virtual environment based on the content metadata comprises:
receiving a first parameter that includes at least one of an environment type or a uniform resource locator (URL) associated with the at least a portion of the 3D virtual environment; and
applying the environment effect to the at least a portion of the 3D virtual environment based on the first parameter.

12. The non-transitory computer-readable storage medium of claim 10, wherein generating the at least a portion of the 3D virtual environment based on the content metadata comprises:
receiving a first parameter that includes at least one of a character type or a uniform resource locator (URL) associated with the character effect; and
applying the character effect to the at least a portion of the 3D virtual environment based on the first parameter.

13. The non-transitory computer-readable storage medium of claim 10, wherein the content metadata further specifies a color effect, and wherein generating the at least a portion of the 3D virtual environment based on the content metadata comprises:
receiving a first parameter that includes at least one of a color value or a starting time; and
applying the color effect to the at least a portion of the 3D virtual environment based on the first parameter.

14. The non-transitory computer-readable storage medium of claim 10, wherein the content metadata further specifies an environment vibration effect, and wherein generating the at least a portion of the 3D virtual environment based on the content metadata comprises:
receiving a first parameter that includes at least one of a motion type or a starting time; and
applying the environment vibration effect to the at least a portion of the 3D virtual environment based on the first parameter.

15. The non-transitory computer-readable storage medium of claim 10, wherein the content metadata further specifies a screen vibration effect, and wherein generating the at least a portion of the 3D virtual environment based on the content metadata comprises:
receiving a first parameter that includes at least one of a motion type or a starting time; and
applying the screen vibration effect to a virtual screen included in the at least a portion of the 3D virtual environment based on the first parameter.

16. The non-transitory computer-readable storage medium of claim 10, wherein the content metadata further specifies a screen location effect, and wherein generating the at least a portion of the 3D virtual environment based on the content metadata comprises:
receiving a first parameter that includes at least one of a location type or a starting time; and
applying the screen location effect to a virtual screen included in the at least a portion of the 3D virtual environment based on the first parameter.

17. The non-transitory computer-readable storage medium of claim 10, wherein the content metadata further specifies a screen size effect, and wherein generating the at least a portion of the 3D virtual environment based on the content metadata comprises:
receiving a first parameter that includes at least one of a size type or a starting time; and
applying the screen size effect to a virtual screen included in the at least a portion of the 3D virtual environment based on the first parameter.

18. The non-transitory computer-readable storage medium of claim 10, wherein the content metadata further specifies a 3D object effect, and wherein generating the at least a portion of the 3D virtual environment based on the content metadata comprises:
receiving a first parameter that includes at least one of an effect type, a starting time, a duration, or a uniform resource locator (URL) associated with the 3D object effect; and
applying the 3D object effect to a 3D object included in the at least a portion of the 3D virtual environment based on the first parameter.

19. A computing device, comprising:
a memory that includes a three-dimensional (3D) object/effects generator; and
a processor that is coupled to the memory and, when executing the 3D object/effects generator, is configured to:
receive a media content item from a content management server,
receive, from the content management server, content metadata associated with the media content item, wherein the content metadata specifies a character effect in which a character watches the media content item in a 3D virtual environment and, while watching the media content item, automatically interacts with a user in the 3D virtual environment by at least one of providing commentary about the media content item to the user, asking the user a question, or responding to the user based on at least one of a sound, a movement, or an input by the user, and
generate at least a portion of the 3D virtual environment based on the content metadata.

20. The computing device of claim 19, wherein the processor, when executing the 3D object/effects generator, is further configured to:
receive a description of the at least a portion of the 3D virtual environment in a first format; and
translate the description of the at least a portion of the 3D virtual environment into a second format that is native to a virtual reality device,
wherein the memory further includes a native virtual reality engine, and the processor, when executing the native virtual reality engine, is configured to display, via the second format, the media content item and the at least a portion of the 3D virtual environment on a display associated with the virtual reality device.

* * * * *